United States Patent [19]

Kineri et al.

[11] Patent Number: 5,401,569

[45] Date of Patent: Mar. 28, 1995

[54] NONLINEAR OPTICAL THIN FILM

[75] Inventors: Tohru Kineri; Masami Mori, both of Chiba, Japan

[73] Assignee: TDK Corporation, Tokyo, Japan

[21] Appl. No.: 21,464

[22] Filed: Feb. 23, 1993

[30] Foreign Application Priority Data

| | | |
|---|---|---|
| May 19, 1992 [JP] | Japan | 4-151588 |
| Oct. 27, 1992 [JP] | Japan | 4-311232 |
| Oct. 30, 1992 [JP] | Japan | 4-316479 |
| Nov. 6, 1992 [JP] | Japan | 4-322627 |
| Jan. 21, 1993 [JP] | Japan | 5-026268 |

[51] Int. Cl.$^6$ .............................. B32B 5/16
[52] U.S. Cl. .............................. 428/323; 428/212; 428/328; 428/434; 428/457; 428/688; 428/689; 428/697; 428/700; 428/701; 359/329; 385/122
[58] Field of Search ............... 428/323, 328, 403, 404, 428/450, 457, 469, 688, 689, 697, 700, 701, 212, 434; 385/122, 130; 427/314, 372.2, 374.1, 398.3; 252/584

[56] References Cited

U.S. PATENT DOCUMENTS

| | | | |
|---|---|---|---|
| 5,023,139 | 6/1991 | Birnboim et al. | 428/402 |
| 5,198,269 | 3/1993 | Swartz et al. | 427/226 |
| 5,234,758 | 8/1993 | Olsen et al. | 428/323 |
| 5,253,103 | 10/1993 | Boyd et al. | 359/329 |

FOREIGN PATENT DOCUMENTS 3-294829  12/1991  Japan .

OTHER PUBLICATIONS

Basic Technologies For Future Industries, Proceedings of the Second Symposium On Photonics Materials, pp. 139–147, 1991.

*Primary Examiner*—Patrick J. Ryan
*Assistant Examiner*—Marie R. Macholl
*Attorney, Agent, or Firm*—Oblon, Spivak, McClelland, Maier & Neustadt

[57] ABSTRACT

A novel nonlinear optical thin film having a high $\chi^{(3)}$ value is provided wherein metal fine particles are uniformly dispersed in a ferroelectric or highly dielectric matrix and heat treated whereby the metal fine particles and matrix are improved in crystallinity. The excitation wavelength can be substantially changed by a choice of the heat treating conditions.

The crystallinity of the metal fine particles and matrix and $\chi^{(3)}$ value are improved by selecting a substrate used or changing the heat treating procedure and heat treating conditions. By forming a portion having a lower content of metal fine particles in a surface portion on an upper and/or lower side of the matrix, the excitation wavelength can be substantially changed and precisely adjusted.

27 Claims, 22 Drawing Sheets

NONLINEAR OPTICAL THIN FILM

BACKGROUND OF THE INVENTION

1. Technical Field

This invention relates to fine particle dispersed composite thin films for use as nonlinear optical materials. These fine particle dispersed composite thin films are utilized as materials having greater nonlinear optical effect in an optical information field as optical switches, light wavelength converter elements or the like.

2. Background Art

Development efforts have been made on glass and similar materials having semiconductor ultrafine particles dispersed therein since they exhibit greater optical nonlinearity. Also glass and colloidal solutions having metal fine particles dispersed therein are reported to have relatively greater nonlinearity. In these materials, quartz glass, multi-component glass, polymers and the like are generally used as the matrix in which fine particles are dispersed.

Glass containing gold fine particles known as "gold ruby glass" is one of well-known ruby glasses. This glass is prepared by once melting glass with about 0.01 wt % of gold added, and then heat treating the glass for color generation.

The gold red glass was reported to have a third-order nonlinear susceptibility $\chi^{(3)}$ of about $10^{-11}$ esu which is not necessarily high enough. This is probably because of the low concentration dispersion that gold has a volume fraction of about $10^{-5}$ in glass. Therefore, one possible approach for increasing nonlinear susceptibility is to increase the concentration of gold fine particles. In the manufacture by a melting method, the solubility limit imposes a certain limit in increasing the concentration.

For overcoming this problem, proposals regarding sputtering and ion implantation methods which are relatively easy to increase the concentration and control the composition were made in Basic Technologies For Future Industries, Proceedings of the Second Symposium on Photonics Materials, P139-147, 1991 and Japanese Patent Application Kokai (JP-A) No. 294829/1991. Au fine particles are dispersed in $SiO_2$ glass matrix by sputtering or ion implantation method in the former, and $SiO_2$ glass thin films and metal fine particles of Au, Ag and Cu grown in island form are alternately stacked in the latter. It is believed that these metal fine particle dispersed glasses develop greater nonlinearity due to excitation of surface plasmon of the dispersed metal fine particles and quantum size effect, leading to high $\chi^{(3)}$ values.

In these proposals, however, $\chi^{(3)}$ is about $1 \times 10^{-7}$ esu at the maximum in the former Proceedings, for example, and a further improvement in $\chi^{(3)}$ is desired. And in these proposals, it was not contemplated to significantly shift the resonance absorption position for adjusting the excitation wavelength. In FIGS. 2 and 3 of the former Proceedings, for example, thin films as deposited are heat treated and measured for absorption spectrum, but the resonance absorption position is shifted thereby only about 30 nm. As a result, for gold fine particles, for example, the excitation wavelength is restricted to about 520 to 550 nm which imposes a limit on an available laser, failing to provide a nonlinear optical material for a particular one of light sources.

DISCLOSURE OF THE INVENTION

A primary object of the present invention is to provide a novel nonlinear optical thin film in which fine particles of a metal are uniformly dispersed in a thin film-shaped ferroelectric or highly dielectric matrix whereby the metal fine particles and the matrix are improved in crystallinity, and which thus has a high $\chi^{(3)}$ value and an excitation wavelength which is substantially shiftable and precisely adjustable.

This and other objects are attained by the present invention which is defined below as (1) to (31).

1. A nonlinear optical thin film containing fine particles of at least one metal in a ferroelectric or highly dielectric matrix.
2. The nonlinear optical thin film of (1) wherein said matrix is made of a material having a dielectric constant of at least about 10 at room temperature.
3. The nonlinear optical thin film of (1) wherein said matrix is of titanium oxide or a composite oxide containing titanium oxide.
4. The nonlinear optical thin film of (1) wherein the metal of which said fine particles are made is Au, Ag, Cu or an alloy thereof.
5. The nonlinear optical thin film of (1) wherein said fine particles have a mean particle size of 1 to 100 nm.
6. The nonlinear optical thin film of (1) wherein said matrix includes grains having a mean grain size of 40 to 1,000 nm.
7. The nonlinear optical thin film of (1) wherein the content of said fine particles is 1 to 80% by volume.
8. The nonlinear optical thin film of (1) wherein said metal fine particles are located at the triple point of grains of said matrix.
9. The nonlinear optical thin film of (1) having a dielectric constant of at least 10.
10. The nonlinear optical thin film of (1) having a third-order nonlinear susceptibility $\chi^{(3)}$ of at least $10^{-7}$ esu.
11. The nonlinear optical thin film of (1) wherein a thin film having fine particles of at least one metal dispersed in a ferroelectric or highly dielectric matrix is formed and then heat treated at a predetermined temperature for adjusting the resonance absorption wavelength position of said fine particles to a desired wavelength.
12. The nonlinear optical thin film of (11) wherein the forming of the thin film is by a co-sputtering technique.
13. The nonlinear optical thin film of (11) wherein the heat treatment is carried out at a temperature of 100° to 1,100° C.
14. The nonlinear optical thin film of (1) which is obtained by forming a thin film having fine particles of at least one metal dispersed in a ferroelectric or highly dielectric matrix, heating and then quenching the thin film at a cooling rate of at least $10^{3}$° C./sec.
15. The nonlinear optical thin film of (14) wherein the heat treatment is by irradiating active energy rays.
16. The nonlinear optical thin film of (14) wherein the forming of the thin film is by a co-sputtering technique.
17. The nonlinear optical thin film of (1) which is formed on a substrate.
18. The nonlinear optical thin film of (17) which is formed on a monoaxially oriented plane of a single crystal substrate surface.
19. The nonlinear optical thin film of (18) wherein a thin film containing a matrix component and a metal fine particle component is formed on the monoaxially oriented plane of a single crystal substrate surface and then heat treated for adjusting the crystallinity and particle size of said fine particles.

20. The nonlinear optical thin film of (19) wherein the heat treatment is carried out at a temperature of 100° to 1,100° C.
21. The nonlinear optical thin film of (19) wherein the heat treatment includes the steps of heating the thin film by irradiating active energy rays and quenching the thin film at a cooling rate of at least $10^3$° C./sec.
22. The nonlinear optical thin film of (19) wherein the forming of the thin film is by a co-sputtering technique.
23. The nonlinear optical thin film of (19) wherein the thin film is formed while maintaining the substrate at a temperature of at least 600° C.
24. The nonlinear optical thin film of (18) which is formed on the monoaxially oriented plane of a single crystal substrate surface while maintaining the substrate at a temperature of at least 600° C.
25. The nonlinear optical thin film of (24) wherein the forming of the thin film is by a co-sputtering technique.
26. The nonlinear optical thin film of (1) wherein fine particles of at least one metal are dispersed in a ferroelectric or highly dielectric matrix such that the metal fine particles are contained at a lower content in a surface portion on an upper and/or lower side than in a middle portion.
27. The nonlinear optical thin film of (1) wherein a thin film having fine particles of at least one metal dispersed in a ferroelectric or highly dielectric matrix is formed as a middle layer, and a surface layer of a ferroelectric or highly dielectric material is formed adjacent to an upper and/or lower side of said thin film.
28. The nonlinear optical thin film of (27) wherein said surface layer contains the metal fine particles in a lower content than said middle layer.
29. The nonlinear optical thin film of (27) wherein said surface layer is free of the metal fine particles.
30. The nonlinear optical thin film of (27) wherein the film forming is by a sputtering technique.
31. The nonlinear optical thin film of (27) which is further subject to heat treatment.

OPERATION

The present invention provides a nonlinear optical thin film in which fine particles of a metal are uniformly dispersed in a thin film-shaped ferroelectric or highly dielectric matrix having a high dielectric constant $\epsilon$ of at least 10 wherein the matrix is amorphous as deposited, but becomes crystalline by heat treatment. It is believed that this crystallographic change occurs due to recrystallization of the matrix in liquid or solid phase. It is believed that in accordance with the matrix crystallization, metal fine particles dispersed in the thin film migrate to the triple point positions of matrix crystal grains. Since this migration allows dispersion of metal fine particles in the thin film to become more uniform, the concentration of metal fine particles can be increased, and the metal fine particles are improved in crystallinity, resulting in metal fine particles and matrix grains both having uniform particle sizes. The metal fine particles are then confined in three dimensions and this results in an improvement in the nonlinearity developed due to excitation of surface plasmon of metal fine particles and quantum size effect, for example, leading to a high nonlinear susceptibility $\chi^{(3)}$ in excess of $10^{-7}$ esu as measured by a degenerate four-wave mixing method as will be described later. Any interaction occurring between the matrix having a high dielectric constant and the metal fine particles dispersed therein which seems to contribute to a nonlinearity improvement also contributes to this improvement in $\chi^{(3)}$. As a result, there is obtained a nonlinear optical material having optical bistability and an optical relaxation time of a ps order which is applicable to light wavelength converter elements such as optical switches and THG.

Further, by heat treating a thin film immediately after deposition, the plasma resonance absorption peak position is shifted toward a longer wavelength as the heat treating temperature becomes higher. The shift can extend to even 100 nm. Apart from a conventionally used heat treatment method using an electric oven or the like with the attendant relatively slow temperature change, quickly heating the thin film by means of a laser or the like followed by quenching causes the matrix and metal fine particles to become uniform in particle size and the like and be further enhanced in crystallinity, leading to a more shift of the plasma resonance absorption peak position.

Further, where a single crystal substrate having a monoaxially oriented surface is used rather than synthetic quartz conventionally used as film-receiving substrates, the matrix having a high dielectric constant and crystallinity used herein can be substantially changed in crystallinity as well as the metal fine particles by changing the heat treating conditions. This results in a higher $\chi^{(3)}$ value and a more shift of the plasma resonance absorption peak position.

Also, since the shift width of the plasma resonance absorption peak position, for example, is further increased by further increasing the contact between the metal fine particle surface and the high dielectric constant material, the shift width of the peak position can be further increased by covering exposed surfaces of those metal fine particles exposed at upper and lower surfaces of the thin film with a high dielectric constant material.

Then the shift width of the peak position can be precisely controlled by controlling the degree of coverage of the metal fine particle surface exposed at the thin film surface, by altering the coating material, by heat treating the coated material, or by selecting heat treating conditions therefor.

According to the present invention, a nonlinear optical thin film having a high $\chi^{(3)}$ value and a widely variable plasma resonance absorption peak position can be obtained by properly selecting heat treating conditions and other conditions.

It is to be noted that U.S. Pat. No. 5,023,139 proposes particles having nonlinear optical properties containing a dielectric material and a metal. This proposal uses polymers such as polydiacetylene, polybenzothiazole and polystyrene or silica as the dielectric and Au, Al and Ag as the metal. By forming particles of a nano order diameter having a core-shell structure from the dielectric and metal, there are obtained particles having improved nonlinear optical properties which can be utilized in a variety of forms as the material having nonlinear optical properties.

Although this proposal is common to the present invention in the combination of a dielectric and metal fine particles, the proposal uses the above-mentioned polymers or silica as the dielectric and refers nowhere to the ferroelectric or highly dielectric material having a dielectric constant $\epsilon$ of at least 10 as used in the present invention. The present invention offers advantages by using the ferroelectric or highly dielectric material as the matrix while the silica used in the previous proposal is a comparative example to the present invention. The previous proposal forms particles having a core-shell structure whereas the present invention is characterized by a thin film structure in which metal fine particles are dispersed in a thin film-shaped ferroelectric or highly dielectric matrix.

ILLUSTRATIVE EMBODIMENTS

Figure 1:
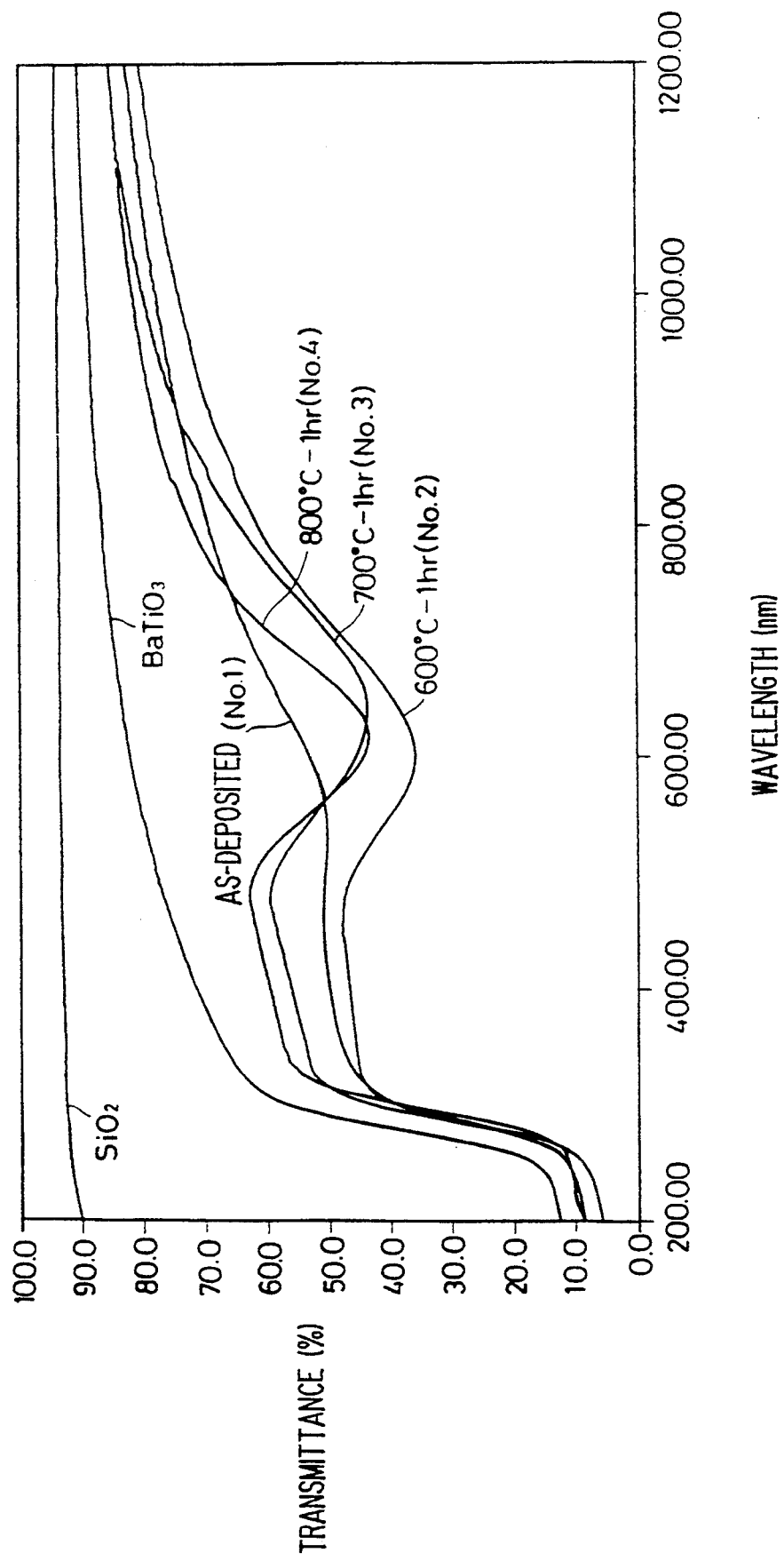
FIGS. 1 and 2 are graphs showing transmission spectra of inventive nonlinear optical thin films obtained in Example 1.

Now several illustrative embodiments of the present invention are described in detail.

The fine particle dispersed composite thin film of the present invention contains fine particles of a metal. The preferred metals used herein are Au (resonance absorption peak position at about 520 nm), Ag (about 370 nm) and Cu (about 630 nm) although various metals alone and alloys may be used and no particular limit is imposed. These metals shift their plasma resonance absorption position by heat treatment in accordance with the present invention.

The fine particles have a mean particle size of 1 to 100 nm, preferably 2 to 30 nm. A mean particle size within this range allows the quantum size effect to exert. The content of fine particles is preferably 1 to 80% by volume, especially 5 to 60% by volume of the entire film. A nonlinear optical thin film with a too lower content are less useful whereas a too higher content leads to an increase of bulk-form properties, resulting in a loss of optical nonlinearity. The mean particle size of fine particle crystals can be determined from an image of a transmission electron microscope (TEM) or from an X-ray diffraction spectrum in accordance with Scherrer's formula. The content may be determined from chemical analysis, ESCA or the like.

The fine particle dispersed composite thin film of the present invention includes a matrix of a ferroelectric or highly dielectric material. The ferroelectric material is one having a dielectric constant of at least about 150 at room temperature in bulk polycrystalline form and the highly dielectric material is one having a dielectric constant of from about 10 to less than about 150 at room temperature in bulk polycrystalline form. These materials change their dielectric constant by heat treatment after film deposition and as a result, the resonance absorption position is substantially shifted.

Preferred ferroelectric materials are perovskite type compounds, examples of which include $A^{1+}B^{5+}O_3$, $A^{2+}B^{4+}O_3$, $A^{3+}B^{3+}O_3$, $A_xBO_3$, $A(B'_{0.67}B''_{0.33})O_3$, $A(B'_{0.33}B''_{0.67})O_3$, $A(B_{0.5}{}^{+3}B_{0.5}{}^{+5})O_3$, $A(B_{0.5}{}^{2+}B_{0.5}{}^{6+})O_3$, $A(B_{0.5}{}^{1+}B_{0.5}{}^{7+})O_3$, $A^{3+}(B_{0.5}{}^{2+}B_{0.5}{}^{4+})O_3$, $A(B_{0.25}{}^{1+}B_{0.75}{}^{5+})O_3$, $A(B_{0.5}{}^{3+}B_{0.5}{}^{4+})O_{2.75}$, and $A(B_{0.5}{}^{2+}B_{0.5}{}^{5+})O_{2.75}$. Exemplary are $BaTiO_3$, $PbTiO_3$, $KTaO_3$, $NaTaO_3$, $SrTiO_3$, $CdTiO_3$, $KNbO_3$, $LiNbO_3$, $LiTaO_3$, PZT ($PbZrO_3$-$PbTiO_3$), and PLZT ($PbZrO_3$-$PbTiO_3$:$La_2O_3$).

Preferred examples of the highly dielectric material include $TiO_2$, $2MgO.TiO_2$, $MgO.TiO_2$, $MgO.2TiO_2$, $ZnO-TiO_2$ and $CaTiO_3$.

Among these ferroelectric and highly dielectric materials, titanium oxide and composite oxides containing titanium oxide (titanates) are preferred, and titanate perovskite type compounds having a dielectric constant of about 100 to 300 at room temperature in bulk polycrystalline form, for example, such as $BaTiO_3$, $SrTiO_3$, $CaTiO_3$ and $PbTiO_3$ are especially preferred.

These matrices are substantially amorphous both immediately after thin film deposition and after heat treatment since no clear peak is observed in their X-ray diffraction spectrum (XRD). On an observation under a transmission electron microscope (TEM), however, grains are generally recognized after heat treatment. These grains have a mean diameter of 40 to 1,000 nm, preferably 45 to 500 nm.

According to the present invention, such a material is formed on a substrate to be described later, for example, in thin film form with the above-mentioned metal fine particles dispersed therein. The thin film having fine particles dispersed in a matrix generally has a thickness of about 0.01 to 5 $\mu$m. The thin film tends to increase $\chi^{(3)}$ value as its thickness increases probably because the amount of metal fine particles increases in a film thickness direction. At a too increased thickness, however, the film loses transmittance and deteriorates its nonlinear optical properties.

Also useful are a mixture of fine particle materials and a mixture of matrix materials.

The thin film or thin film element of the present invention can be formed by various methods, for example, alternate sputtering of matrix material and metal fine particles, and multi-target sputtering of matrix material and metal fine particle material although co-sputtering using a matrix material target and metal chips resting thereon is preferred for productivity.

Sputtering may be carried out in any desired mode although RF magnetron sputtering is preferred in view of film deposition rate or the like. Preferred conditions include an operating pressure of about $10^{-3}$ to $10^{-2}$ Torr and a substrate temperature of room temperature to about 300° C. By altering the film deposition rate and target area of the matrix material and metal fine particles, the fine particles can be readily dispersed in the above-defined content.

Alternatively, an ion implantation technique as described in the above-referred Proceedings of the Symposium on Photonics Materials may be used instead of the co-sputtering.

The substrate on which a film is to be deposited according to the present invention is not particularly limited and those commonly used for such a purpose, for example, synthetic quartz glass substrates may be used. Particularly when a monoaxially oriented plane of a single crystal surface is used as the film-receiving substrate, grains in the matrix material grow upon heat treatment to be described later or at a substrate temperature of 600° C. or higher, resulting in a nonlinear optical thin film device in which metal particles in the matrix have improved crystallinity and the crystal grain size is large and uniform.

Such substrate materials are single crystal substrates of $\alpha$-$Al_2O_3$, Si, Ge, GaAs, MgO, MgO-$Al_2O_3$, etc. To obtain advantages as mentioned above, no limit is imposed on the substrate having a surface in the form of a substantially monoaxially oriented plane, with transparent single crystal substrates having an oriented plane such as C plane (0001) and R plane (1102) of $\alpha$-$Al_2O_3$ (sapphire) and (100) plane and (111) plane of MgO being preferred. Where a waveguide type device is desired, a single crystal substrate having such a surface as given by Si (100) plane may be used.

The thin film as deposited has fine particles dispersed in a matrix. In the practice of the invention, heat treatment is preferably carried out on the thin film immediately after its deposition in order to tailor the resonance absorption position. The heat treatment may be carried out in air or an inert gas atmosphere by holding the film at a temperature of at least 100° C., especially at least 300° C., further at least 500° C. and generally up to 1,100° C., especially up to 1,000° C. for up to about 10 hours and at least 1 minute, especially at least 10 minutes. This heat treatment causes the resonance absorption position to be shifted even over a width of 100 nm. Therefore, if the relationship between heat treating conditions and absorption position is empirically determined, a nonlinear optical thin film having a desired resonance absorption peak position can be readily obtained in a reproducible manner.

These advantages of the heat treatment are similarly available by using a monoaxially oriented plane of a single crystal surface as a film-receiving substrate as mentioned above and heating the substrate at a temperature of at least 600° C. during film deposition. More particularly, the matrix and metal fine particles deposited as a thin film under these conditions form a film which is oriented coaxially with the substrate surface without heat treatment after film deposition. It is to be noted that a heat treatment is sometimes necessary after film deposition for the purposes of removing stresses from the film.

Separate from the above-mentioned heat treatment techniques, the following heat treatment procedure may be employed in order to provide more advantages. The procedure includes rapid heating and rapid quenching, especially inclusive of flash annealing with rapid quenching at a cooling rate of at least $10^3$° C./sec. A cooling rate of at least $10^3$° C./sec. is required because a cooling rate of less than $10^3$° C./sec. is insufficient for the matrix to crystallize uniformly and the resultant fine crystals become variant in size. The upper limit of the cooling rate is not limited, but usually about $10^7$° C./sec. The flash annealing generally uses the same heating rate as the cooling rate.

The flash annealing may be effected by any method which can provide the above-mentioned cooling rate and usually uses active energy rays capable of rapid heating and quenching of thin films.

A practical source for active energy rays is preferably a laser although a halogen light gathering oven, infrared light gathering oven, electron radiation or the like may be used. The laser which is a preferred source is not particularly limited as long as it can provide heat-generating radiation, and the laser is not limited in the oscillation wavelength range. For example, a solid laser, dye laser, excimer laser, free electron laser or the like may be used, and pulse irradiation may be counted for or continuous wave (CW) laser may be used for irradiation.

For example, for pulse irradiation of an excimer laser, irradiation conditions include 10 mJ to 1000 mJ per shot and about 1 to 10 shots of irradiation. Provided that one cycle of heating and quenching is from the start of a first shot to the start of a second shot, the cycle duration may be 10 nanoseconds (ns) to 10 milliseconds (ms), preferably 10 nanoseconds (ns) to 100 nanoseconds (ns).

The heat treatment method of the present invention is characterized by heat treatment by providing thermal energy within a short time, and the duration of one cycle of heating and quenching is 10 ns to 1 second, preferably 10 ns to 100 ms even when another laser is used. Therefore, the heat treating time in accordance with the heat treatment method of the present invention is preferably selected to provide a cycle duration within 1 second, more preferably 10 ns to 100 ms although the duration varies with a particular active energy ray used.

The heat treatment method of the present invention may use only one cycle of heating followed by quenching or repetition of cycles such as pulse irradiation of an excimer laser as mentioned above. In the case of repetitive cycles, the number of cycles is properly selected in accordance with the laser used and an object to be exposed thereto. Also the flash annealing of this heat treatment method may be combined with the aforementioned heat treatment method. By such a properly combined mode of heat treatment, the plasma resonance absorption peak position is shiftable.

It seems that the maximum temperature of the thin film achievable by flash annealing of this heat treatment method is 1000° C. or higher. It seems that the upper limit is generally about $10^{7}$° C.

Further the heat treating atmosphere is not particularly limited and generally in air.

It can be confirmed by an observation under a transmission electron microscope (TEM) that a heat treatment method as mentioned above causes crystallization of the matrix used in the invention. More particularly, the matrix is amorphous as deposited, but grains are observable after heat treatment. It is also observed that more metal fine particles are located at the triple point of matrix grains. The improvement in crystallinity of metal fine particles is confirmable from the results of X-ray diffractometry (XRD). More particularly, the peak in the XRD spectrum attributable to the metal which is broad immediately after film deposition becomes sharp at the end of heat treatment, outstandingly when the film-forming substrate used is a monoaxially oriented plane of a single crystal surface and especially when the heat treatment method includes flash annealing as mentioned above.

The $SiO_2$ glass used as the matrix in the above-referred Proceedings, however, remains amorphous and undergoes no crystallization even after such heat treatment and so, fails to accomplish such advantages including an increase of $\chi^{(3)}$ value in excess of $10^{-7}$ esu and a shifting of the plasma resonance absorption peak position by heat treatment as found in the present invention. It is thus believed that these advantages of the present invention are obtained only when a ferroelectric or highly dielectric matrix material having a dielectric constant of at least 10 is used and crystallizes.

Moreover, in accordance with the shift width controlling method mentioned below, there is obtained a thin film having the advantages that shifting of the plasma resonance absorption peak position according to the invention is further enhanced and the shift width of the peak position is finely controllable.

These advantages are available with a thin film having metal fine particles dispersed in a ferroelectric or highly dielectric matrix wherein a portion where the content of metal fine particles decreases stepwise or continuously is formed on a surface (upper) and/or substrate interface (lower) side of the thin film, or a portion free of metal fine particles is formed on a surface or substrate interface side of the thin film or both. The same advantages can be obtained with a configuration wherein a ferroelectric or highly dielectric matrix in thin film form having metal fine particles dispersed therein is formed as a middle layer, and one or both of the surfaces of the middle layer are covered with a ferroelectric or highly dielectric material as used herein. The term stepwise used herein is not limited to one step, but encompasses the presence of a portion wherein the content of metal fine particles varies in at least two steps.

The aforementioned JP-A 294829/1991 proposes to alternately deposit metal fine particles grown in island form and an optically transparent substance by sputtering, but does not refer to metal fine particles dispersed in a ferroelectric or highly dielectric matrix as in the present invention. Thus the $\chi^{(3)}$ value is $2\times10^{-9}$ esu at the highest in Examples and extremely lower than the value of about $10^{-6}$ esu according to the present invention. Since a material having a low dielectric constant is used as the matrix, the advantage of shifting the plasma resonance absorption peak position is never obtained even when the surface is covered with the matrix material.

The shift width controlling method results in a thin film in which a portion where the content of metal fine particles is low or nil is present on a surface interface (upper) and/or substrate interface (lower) side of the thin film. The content can be decreased by depositing a film from a metal fine particle material and a matrix material by two source sputtering while varying the film deposition rates of the respective materials stepwise or continuously. A metal fine particle-free portion can be formed by sputtering a matrix material alone. Then the area of metal fine particles in contact with a material other than the high dielectric constant material in the thin film can be effectively reduced. It is thus believed that the advantages of the shift width controlling method are accomplished by controlling the contact area.

Such a portion where the content of metal fine particles is low or nil may be formed by using the following method. For example, a ferroelectric or highly dielectric material as mentioned above is previously sputtered to form an underlying layer as a surface layer (the underlying layer may or may not be heat treated as previously mentioned), and subsequently, a middle layer of a fine particle dispersed matrix is formed by co-sputtering or multi-target sputtering of a metal fine particle material and a matrix material. At this point, metal fine particles near the interface between the underlying layer and the middle layer partially diffuse into the underlying layer due to irregularities of the underlying layer surface. If the heat treatment is then done as desired, the interface between the underlying layer and the middle layer becomes more obscure due to crystal grain growth of metal fine particles near the interface with the previously deposited underlying layer. This method allows the metal fine particles which is otherwise in contact with a low dielectric constant substrate to be covered with the underlying layer material having a high dielectric constant. Further, since the quantity of change of the plasma resonance absorption peak position varies depending on whether or not the underlying layer is heat treated before a middle layer thin film of metal fine particle-dispersed matrix is formed on the underlying layer, the heat treatment of the underlying layer may be utilized for fine adjustment of the wavelength position.

Alternatively, a middle layer thin film of a fine particle dispersed matrix is first formed by co-sputtering or multi-target sputtering of a metal fine particle material and a ferroelectric or highly dielectric matrix material (in this embodiment, the underlying layer may or may not be formed). Thereafter, a ferroelectric or highly dielectric material as mentioned above is deposited on the middle layer by sputtering to form an overlying layer as a surface layer. At this point, a portion having a reduced content of metal fine particles and a metal fine particle-free portion are formed near the interface between the middle layer and the overlying layer due to irregularities of the middle layer surface. This method allows those metal fine particles exposed at the middle layer surface to be covered with a high dielectric constant material. A change of the middle layer surface by this treatment can be confirmed by observing an atomic force microscope (AFM) image. A change of the metal fine particle content in the thin film in a thickness direction can be confirmed by observing a transmission electron microscope (TEM) image.

The thus obtained overlying layer thin film of high dielectric constant material covering the middle layer thin film surface may or may not be subject to the aforementioned heat treatment. Since the shift width of the plasma resonance absorption peak position varies depending on whether or not heat treatment is done, this behavior may be utilized for fine adjustment of the wavelength position.

The surface layer for controlling the shift width may be established by depositing a film from a metal fine particle material and a matrix material by two-target sputtering while varying the film deposition rates of the respective materials stepwise or continuously or by forming an underlying or overlying layer as the surface layer, or both. The embodiment wherein the surface layer at the interface with the overlying layer is essentially formed is preferred in that for the thin film in which the middle layer and optionally, the underlying layer are formed under appropriate conditions and the plasma resonance absorption peak position is controlled within the wavelength range over which the plasma resonance absorption peak position is controllable by the overlying layer, more precise fine adjustment of the peak position can be made on the basis of the wavelength measurements by utilizing the overlying layer.

The materials used to form the middle and surface layers according to the present invention may be used in admixture of two or more if necessary. Further, different materials may be used between the middle and underlying layers and between the middle and overlying layers. By utilizing a material having a different dielectric constant for the underlying or overlying layer, the shift width of the plasma resonance absorption peak position can be varied.

AS previously described, the middle, underlying and overlying layers of such ferroelectric or highly dielectric materials are substantially amorphous since no definite peak is observed in X-ray diffraction spectrum (XRD) both immediately after film deposition and after heat treatment. It is to be noted that an observation under a transmission electron microscope (TEM) generally reveals grains after heat treatment as previously mentioned.

When the shift width is controlled, the middle layer thin film has a thickness of about 0.01 to 10 $\mu$m, more preferably about 0.01 to 0.1 $\mu$m. If the middle layer thin film is too thick, the film becomes low in transmittance and degraded in nonlinear optical properties. If the middle layer thin film is too thin, metal fine particles cannot normally grow in the matrix, failing to achieve normal nonlinear optical properties.

Moreover, the overlying and underlying layer thin films have a thickness of up to about 0.2 $\mu$m, preferably about 0.005 to 1.0 $\mu$m. These thin films are expected to cause more intense interaction to occur between metal fine particles and high dielectric constant material by covering those metal fine particles exposed over the middle layer. Then by controlling the degree of coverage, and more specifically by controlling the film thickness of the overlying or underlying layer, for example, the shift width of the plasma resonance absorption peak position can be controlled. Therefore, a less wavelength shift occurs even when the film thickness exceeds the thickness necessary to cover the exposed metal fine particles. In the embodiment wherein a portion where the content of metal fine particles decreases is disposed on the middle layer surface, these surface layers preferably have a metal fine particle content of up to about $\frac{1}{2}$, more preferably 0 to about 1/10 of the metal fine particle content of the middle layer. It is to be noted that some surface layers thus deposited are not clearly discriminatable.

The middle, underlying and overlying layers may be deposited by various methods as previously mentioned, but preferably by using a matrix material and a metal fine particle material as targets and co-sputtering them in accordance with a RF magnetron sputtering technique for the same reason as previously mentioned. By changing the amount of metal chips used in this procedure, the content of metal fine particles can be varied, thereby forming a surface layer in which the content of metal fine particles is controlled in a film thickness direction.

The film-receiving substrate utilized for controlling the shift width may be made of commonly used materials as previously mentioned. The aforementioned advantages are obtained by using a substrate having a monoaxially oriented plane on a surface.

As to the heat treatment, any of the aforementioned methods may be conveniently used with similar advantages.

By providing the middle layer and optionally the underlying and/or overlying layer, there can be obtained a nonlinear optical thin film having a plasma resonance absorption peak position set at a desired wavelength.

In one particular shift width adjusting method, a heat treatment which is effective in significantly shifting the wavelength, but is difficult to precisely control the shift width is first employed, if necessary. By setting appropriate heat treating conditions, a wavelength approximate to the desired peak position can be obtained. By previously providing a portion having a lower content of metal fine particles, preferably a metal fine particle-free layer as a surface layer at an upper or lower side of the middle layer, the quantity of change of the peak position can be increased. By providing such portions at both the upper and lower sides, the quantity of change is further increased.

Then, by providing a portion having a lower content of metal fine particles than the middle layer, especially at the upper side optionally after the middle layer is heat treated, more fine adjustment of the peak position after the heat treatment becomes possible. More particularly, if a nonlinear optical thin film resulting from optional heat treatment of the middle layer prior to deposition of the overlying layer requires further fine adjustment of its peak position, then a high dielectric constant material may be selected and deposited on the thin film to form an overlying layer. By a proper choice of the thickness of an overlying thin film and heat treating conditions (inclusive of elimination of heat treatment), finer condition settings are possible.

The relationship between several factors for adjusting the plasma resonance absorption peak position and the quantity of change of the peak position may be empirically determined for a particular case.

The nonlinear optical thin films of the present invention using a ferroelectric or highly dielectric material generally have a dielectric constant $\epsilon$ of at least 10, especially at least 100, further at least 150, moreover at least 200 when actually measured. The dielectric constant of thin films is measured by forming a platinum thin film lower electrode on a synthetic quartz glass substrate by sputtering, forming thereon a thin film to be tested, further forming thereon a pad upper electrode of platinum having a diameter of 1 mm and optionally effecting heat treatment. Using a LF impedance analyzer, C and Q of the thin film are measured, from which $\epsilon$ is calculated. The dielectric constant $\epsilon$ is generally at least 10 even immediately after film deposition.

The thin films or elements using a ferroelectric or highly dielectric material generally have a $\chi^{(3)}$ value of $10^{-7}$ esu or more, especially $10^{-6}$ esu at the maximum on actual measurement, especially when grain growth of metal fine particles is controlled by the aforementioned heat treatment. Such high $\chi^{(3)}$ values are obtained probably because metal fine particles are dispersed in the matrix in a high concentration and the matrix material used has a high dielectric constant. It is to be noted that the $\chi^{(3)}$ value can be measured in accordance with the phase conjugated type degenerate four-wave mixing method (DFWM) described in the above-referred Proceedings of the Symposium on Photonics Materials. Since the above-mentioned $\chi^{(3)}$ values are values obtained using the second harmonic (532 nm) of a Nd:YAG laser (1.06 μm), but not values at the plasma resonance absorption peak position, the $\chi^{(3)}$ value at the plasma resonance absorption peak position will be higher in the range of at least $10^{-7}$ esu, especially at least $10^{-6}$ esu.

EXAMPLE

Examples of the present invention are given below by way of illustration.

EXAMPLE 1

Using an RF magnetron sputtering apparatus, co-sputtering was carried out on a BaTiO$_3$ target having Au chips rested thereon. The substrate used was synthetic quartz glass. The thin film forming conditions included an argon atmosphere, a gas pressure of $5 \times 10^{-3}$ Torr, a substrate temperature of 150° C., and an RF power of 100 W. Thin films were formed by controlling the concentration of Au in accordance with the amounts of Au chips and controlling the film thickness in accordance with the sputtering time.

Next, the thin films were heat treated at a predetermined temperature, obtaining sample Nos. 1–4, 11–14 and 21–23 on which were measured various properties. Table 1 shows the heat treating conditions, the amount of Au dispersed (vol %) and film thickness.

TABLE 1

| Sample No. | Au dispersed (vol %) | Film thickness (μm) | Heat treating conditions | Plasma absorption peak position (eV) | (nm) |
|---|---|---|---|---|---|
| 1 | 3.74% | 0.11 | — | 2.303 | 538 |
| 2 | 3.74% | 0.11 | 600° C.-1 hr. | 2.055 | 603 |
| 3 | 3.74% | 0.11 | 700° C.-1 hr. | 1.943 | 638 |
| 4 | 3.74% | 0.11 | 800° C.-1 hr. | 1.989 | 623 |
| 11 | 3.74% | 0.23 | — | 2.324 | 533 |
| 12 | 3.74% | 0.23 | 600° C.-1 hr. | 2.108 | 588 |
| 13 | 3.74% | 0.23 | 700° C.-1 hr. | 1.989 | 623 |
| 14 | 3.74% | 0.23 | 800° C.-1 hr. | 1.989 | 623 |
| 21 | 3.74% | 0.28 | — | 2.313 | 536 |
| 22 | 3.74% | 0.28 | 500° C.-1 hr. | 2.190 | 566 |
| 23 | 3.74% | 0.28 | 600° C.-1 hr. | 2.119 | 585 |

Figure 2:
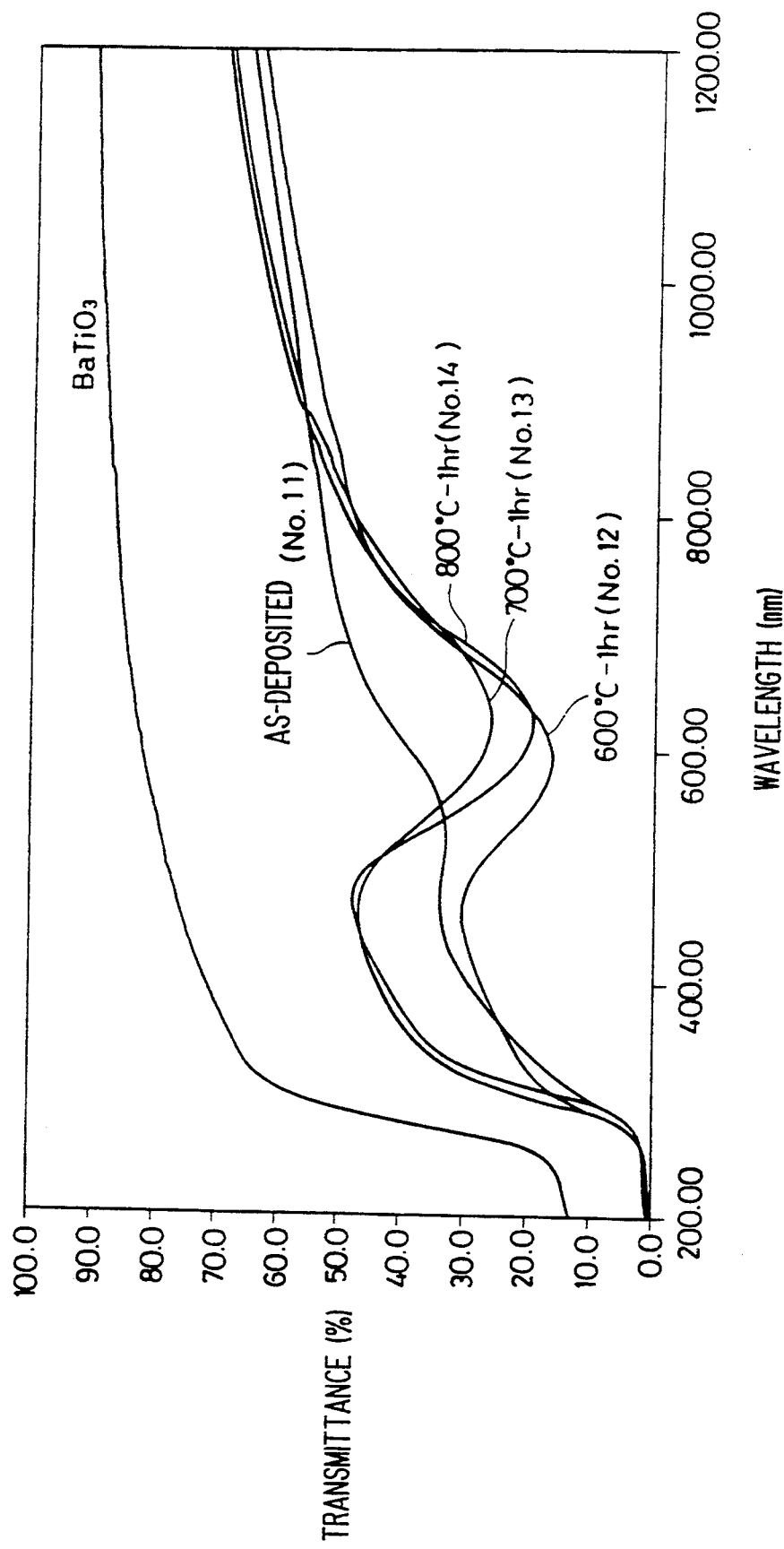
Figure 3:
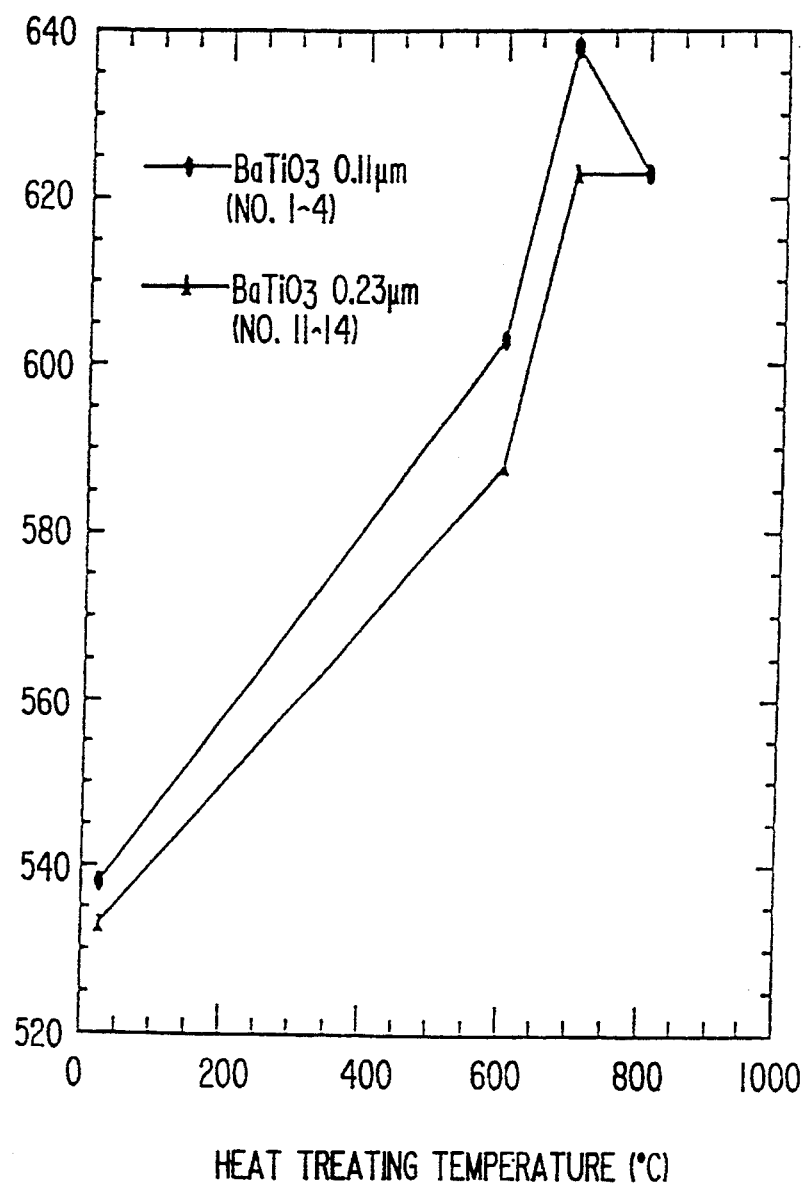
FIG. 3 is a graph showing the plasma absorption position relative to heat treating temperature of inventive nonlinear optical thin films obtained in Example 1.

FIGS. 1 and 2 show the transmission spectra of sample Nos. 1–4 and 11–14, respectively. From the transmission spectra, the plasma resonance absorption peak position was determined. The results are shown in Table 1 and FIG. 3. It is seen from these data that the absorption peak position experienced a shift of up to 100 nm under certain heat treating conditions.

Figure 4:
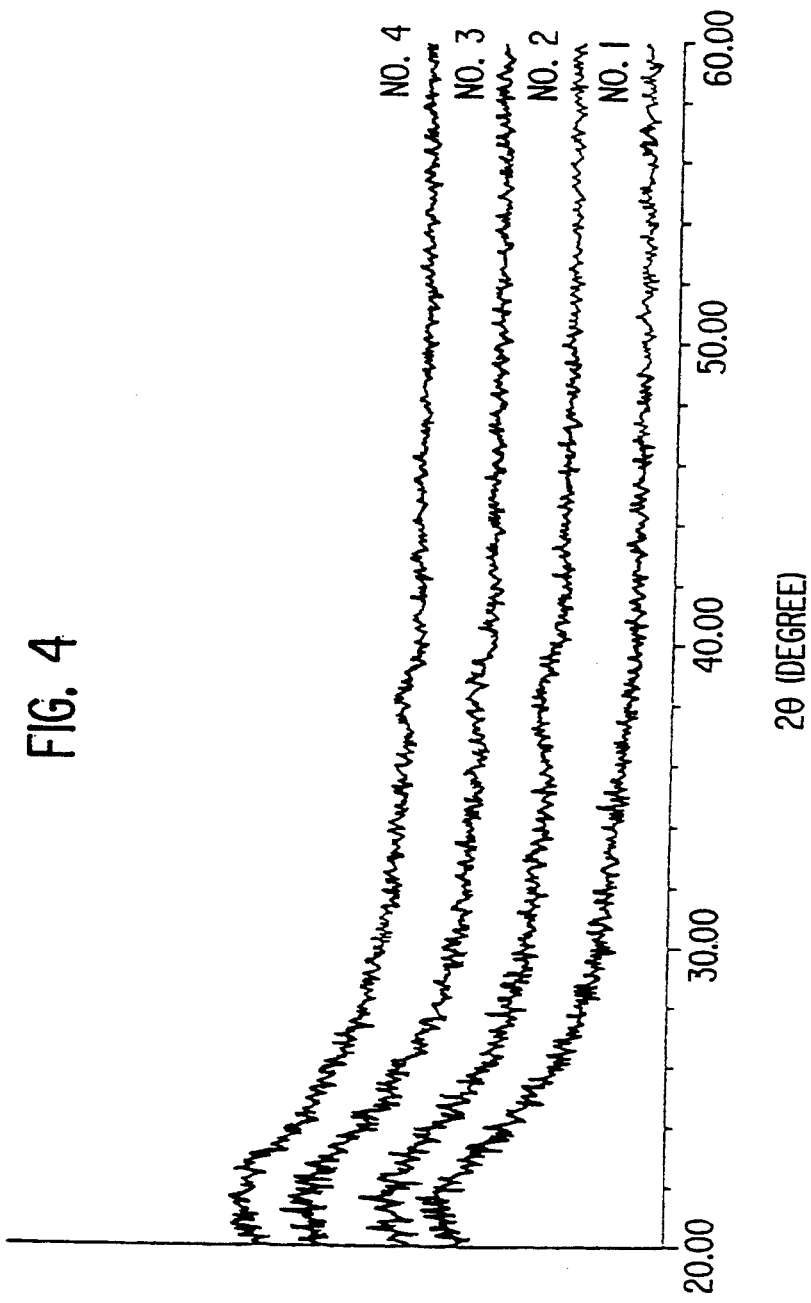
FIG. 4 is a graph showing X-ray diffraction spectrum of inventive nonlinear optical thin films obtained in Example 1.

FIG. 4 shows the X-ray diffraction spectra of sample Nos. 1–4. It is seen from these spectra that the matrices are amorphous. It was confirmed from a TEM image that the matrix crystallized with Au fine particles.

Figure 5:
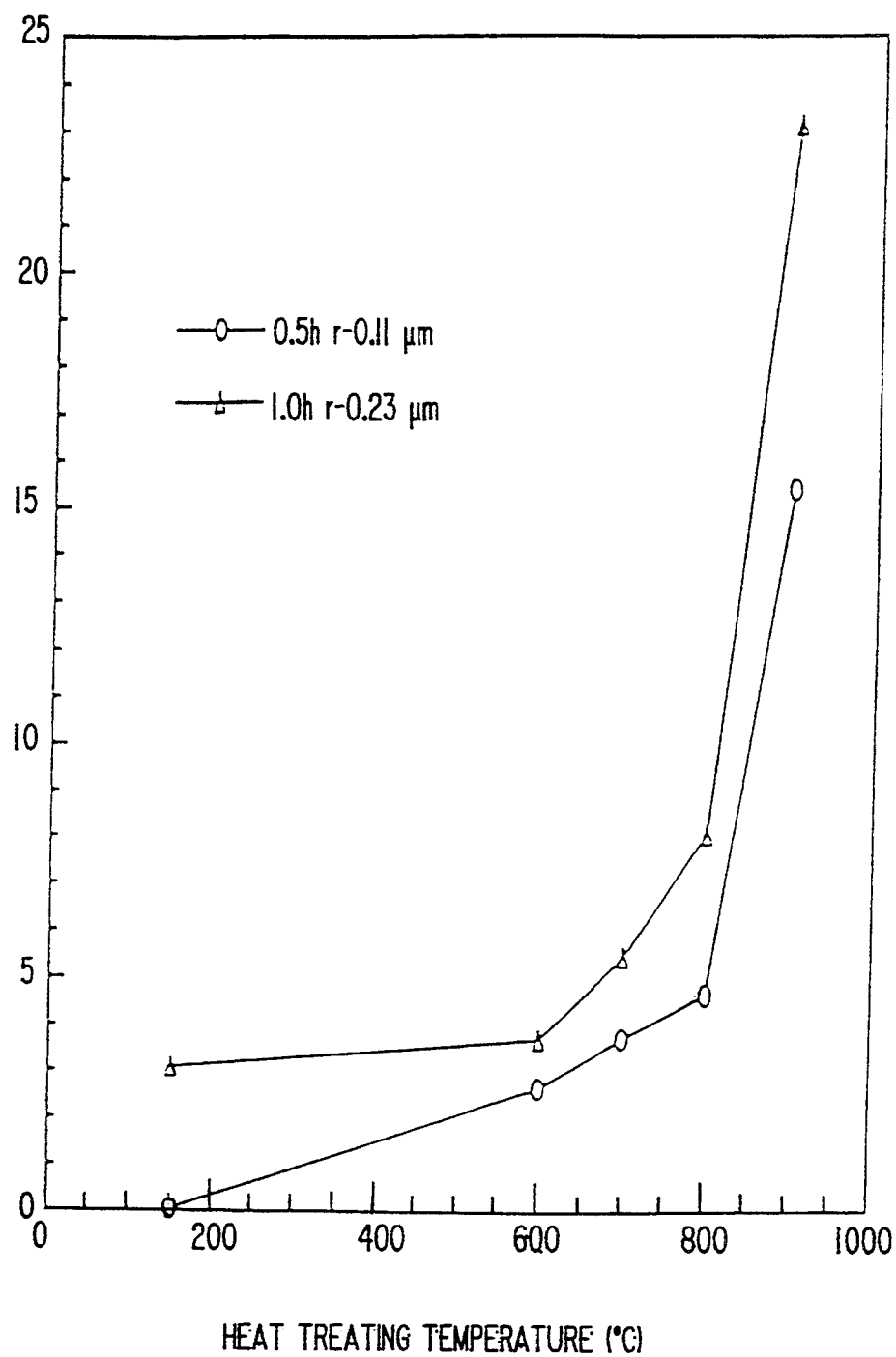
FIG. 5 is a graph showing the mean particle size of fine particles relative to heat treating temperature of inventive nonlinear optical thin films obtained in Example 1.
Figure 6:
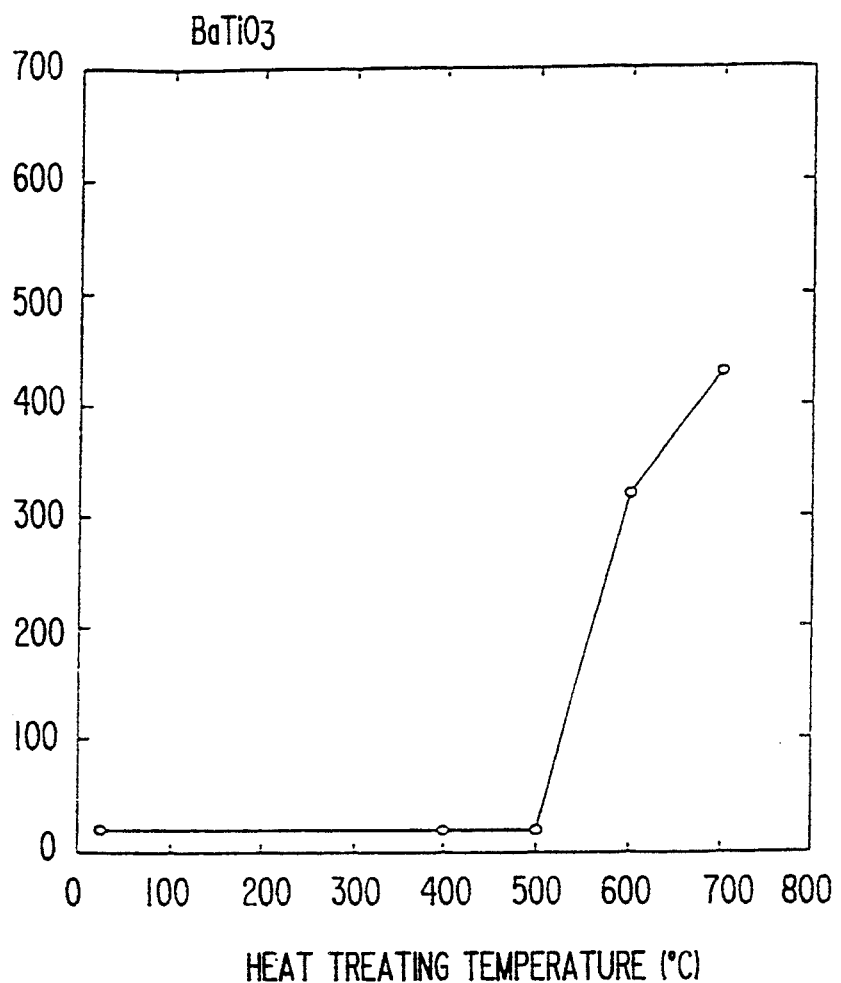
FIG. 6 is a graph showing the dielectric constant relative to heat treating temperature of the matrix material ($BaTiO_3$) of which inventive nonlinear optical thin films were obtained in Example 1.

Further FIG. 5 shows the mean particle size of Au fine particles relative to the heat treating temperature. Although FIG. 5 suggests that heat treatment caused the fine particles to become coarse, only the enlargement of the particle diameter cannot account for a shift of the resonance absorption peak position. Then the dielectric constant $\epsilon$ at room temperature of a sputtered BaTiO$_3$ film having a thickness of 0.5 μm was measured as a function of heat treating temperature. The results are shown in FIG. 6. It is seen from FIG. 6 that a change of $\epsilon$ of the matrix is correlated to a shift of the absorption position. In fact, the samples were measured for dielectric constant as mentioned above to find values of 15 or higher and values of 20 to 300 for the heat treated samples.

COMPARATIVE EXAMPLE 1

Thin film sample Nos. 31–38 having Au fine particles dispersed in a SiO$_2$ glass matrix were prepared by the same procedure as Example 1 except that the BaTiO$_3$ was replaced by a SiO$_2$ target and an RF power of 200 W was used. The results are shown in Table 2.

TABLE 2

| Sample No. | Au dispersed (vol %) | Film thickness (μm) | Heat treating conditions | Plasma absorption peak position (eV) | (nm) |
|---|---|---|---|---|---|
| 31 | 3.74% | 0.89 | — | — | — |
| 32 | 3.74% | 0.89 | 900° C.-1 hr. | 2.487 | 499 |
| 33 | 3.74% | 0.89 | 900° C.-3 hr. | 2.438 | 508 |
| 34 | 3.74% | 0.89 | 900° C.-5 hr. | 2.391 | 519 |
| 35 | 3.74% | 0.27 | 900° C.-3 hr. | 2.391 | 519 |
| 36 | 3.74% | 0.60 | 900° C.-3 hr. | 2.391 | 519 |

TABLE 2-continued

| Sample No. | Au dispersed (vol %) | Film thickness (μm) | Heat treating conditions | Plasma absorption peak position (eV) | Plasma absorption peak position (nm) |
|---|---|---|---|---|---|
| 37 | 3.74% | 0.91 | 900° C.-3 hr. | 2.415 | 513 |
| 38 | 3.74% | 1.23 | 900° C.-3 hr. | 2.391 | 519 |

For the $SiO_2$ matrix, the plasma resonance absorption peak position shifted only 30 nm at most independent of the heat treating temperature and time, and the excitation wavelength is limited. In contrast, for the $BaTiO_3$ matrix according to the invention, as the heat treating temperature increases, the absorption peak position shifts toward a longer wavelength and a shift as great as 100 nm can take place. The advantages of the invention are thus evident.

EXAMPLE 2

Fine particle-dispersed thin film sample Nos. 41–44 were prepared by the same procedure as Example 1 except that the fine particles were changed to those of Ag. The results are shown in Table 3, from which the advantages of the invention are evident. All the samples had $\epsilon$ of at least 10.

TABLE 3

| Sample No. | Au dispersed (vol %) | Film thickness (μm) | Heat treating conditions | Plasma absorption peak position (eV) | Plasma absorption peak position (nm) |
|---|---|---|---|---|---|
| 41 | 3.74 | 0.28 | — | 3.26 | 380 |
| 42 | 3.74 | 0.28 | 500° C.-1 hr. | 2.46 | 504 |
| 43 | 3.74 | 0.28 | 600° C.-1 hr. | 2.38 | 520 |
| 44 | 3.74 | 0.28 | 900° C.-1 hr. | 2.35 | 528 |

EXAMPLE 3

Fine particle-dispersed thin films were prepared by the same procedure as Example 1 except that the substrate was replaced by a $Al_2O_3$ single crystal substrate and the $BaTiO_3$ in Example 1 was replaced by a $SrTiO_3$ target. These samples for the measurement of properties are designated Nos. 51, 52 and 61–63.

Except for sample No. 63, these thin films were then heat treated at a predetermined temperature and measured for particle size, film thickness, metal fine particle concentration, transmittance and plasma resonance absorption peak position, and $\chi^{(3)}$ value in accordance with the above-mentioned methods. Note that the $\chi^{(3)}$ value was measured by the DFWM method using a laser wavelength of 532 nm. The results are shown in Table 4.

TABLE 4

| Sample No. | Matrix | Au dispersed (vol %) | Film thickness (μm) | Heat treating conditions | Mean particle size (nm) | Transmittance (%) | Plasma absorption peak (nm) | $\chi^{(3)}$ value @ 543 nm (esu) | Remarks |
|---|---|---|---|---|---|---|---|---|---|
| 51 | $BaTiO_3$ | 3.74 | 0.23 | 900° C.-1 hr. | 20–25 | 28 | 610.0 | $2.44 \times 10^{-7}$ | |
| 52 | $BaTiO_3$ | 3.74 | 0.23 | 900° C.-1 hr. | 30 | 24 | 635.0 | $2.74 \times 10^{-7}$ | $Al_2O_3$ substrate |
| 61 | $SrTiO_3$ | 10.74 | 0.03 | 900° C.-1 hr. | 25–28 | 35 | 594.5 | $1.64 \times 10^{-6}$ | |
| 62 | $SrTiO_3$ | 10.74 | 0.015 | 900° C.-16 hr. | 18 | 60 | 561.5 | $1.55 \times 10^{-6}$ | |
| 63 | $SrTiO_3$ | 10.74 | 0.03 | untreated | 14 | 20 | 582.5 | $1.30 \times 10^{-6}$ | |

It is evident from Table 4 that the $\chi^{(3)}$ value of the fine particle-dispersed thin films based on the $BaTiO_3$ or $SrTiO_3$ matrix as measured at 523 nm increased to $10^{-7}$ esu or higher and even to $10^{-6}$ esu or higher at the maximum. The samples of Examples 1 and 2 also showed $\chi^{(3)}$ values of higher than $10^{-7}$ esu. Since the wavelength of 532 nm used herein was not the absorption peak position, higher $\chi^{(3)}$ values would appear at the absorption peak position. The thin films were measured for dielectric constant $\epsilon$ in accordance with the aforementioned method, with sample Nos. 51–52 and 61–63 showing values of 20 to 300.

COMPARATIVE EXAMPLE 2

Like Comparative Example 1, Au fine particle-dispersed thin films based on a $SiO_2$ glass matrix were prepared, which are designated sample Nos. 71–73. Measurements were made on these samples as in Example 3. The results are shown in Table 5.

TABLE 5

| Sample No. | Matrix | Au dispersed (vol %) | Film thickness (μm) | Heat treating conditions | Mean particle size (nm) | Transmittance (%) | Plasma absorption peak (nm) | $\chi^{(3)}$ value 532 nm (esu) |
|---|---|---|---|---|---|---|---|---|
| 71 | $SiO_2$ | 2.50 | 0.71 | 900° C.-1 hr. | 3–5 | 63 | 519.0 | $7.29 \times 10^{-10}$ |
| 72 | $SiO_2$ | 3.74 | 0.27 | 900° C.-5 hr. | 4–5 | 38 | 519.0 | $1.49 \times 10^{-8}$ |
| 73 | $SiO_2$ | 3.74 | 0.6 | 900° C.-5 hr. | 4–5 | 26 | 519.0 | $7.78 \times 10^{-9}$ |

It is evident from Table 5 that for the $SiO_2$ matrix, the $\chi^{(3)}$ value is less than $10^{-8}$ esu.

EXAMPLE 4

A thin film was prepared as in Example 1. This is designated thin film A.

Thin film A was flash-annealed in air by exposing it to 5 shots of radiation from an excimer laser at a wavelength of 193 nm and 200 mJ/shot. This is designated thin film A1. In this flash annealing, the duration taken from the start of the first shot to the start of the second shot was about 50 ms. During the flash annealing, probably the thin film remained at temperatures in the range of about $10^3°$ to about $10^7°$ C. The laser heating and cooling rates were both about $10^3°$ to $10^7°$ C./sec., at which the thin film was heated from room temperature (about 25° C.) and quenched to room temperature (about 25° C.).

Thin film A was heat treated by heating it at 100° C./hr. in an electric oven, holding at 900° C. for one hour, and allowing it to cool down. This is designated thin film A2. The film was allowed to cool down at a rate of 100° C./hr. to room temperature (about 25° C.).

Figure 7:
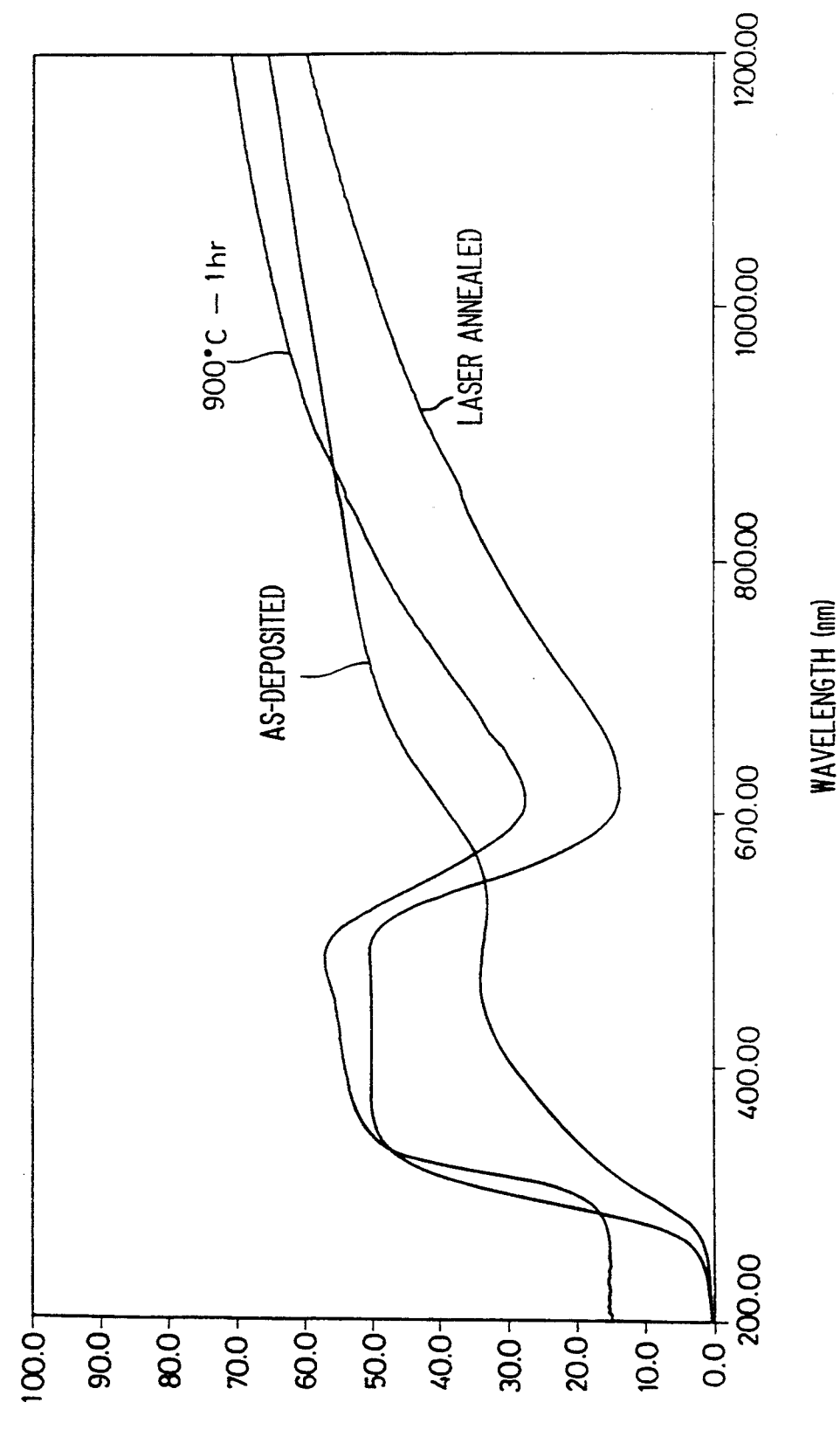
FIG. 7 is a graph showing the transmission spectrum of inventive and comparative nonlinear optical thin films obtained in Example 4.

Thin films A, A1 and A2 were measured for transmission spectrum. The results are shown in FIG. 7. From the transmission spectrum, the plasma resonance absorption peak position was determined. The results are shown in Table 6. The heat treating conditions, the amount of Au dispersed (vol %) and film thickness are also shown in Table 6.

TABLE 6

| Sample No. | BaTiO$_3$-Au system | | | Plasma absorption peak position | |
|---|---|---|---|---|---|
| | Au dispersed (vol %) | Film thickness (Å) | Heat treatment | (eV) | (nm) |
| A | 7.40 | 2000 | — | 2.303 | 538 |
| A1 | 7.40 | 2000 | laser aneal | 1.922 | 645 |
| A2 | 7.40 | 2000 | 900° C.-1 hr. | 1.987 | 635 |

It is evident from FIG. 7 and Table 6 that the laser annealed thin film A1 had the absorption peak wavelength shifted to the longest wavelength and exhibited a sharp absorption peak.

Figure 8:
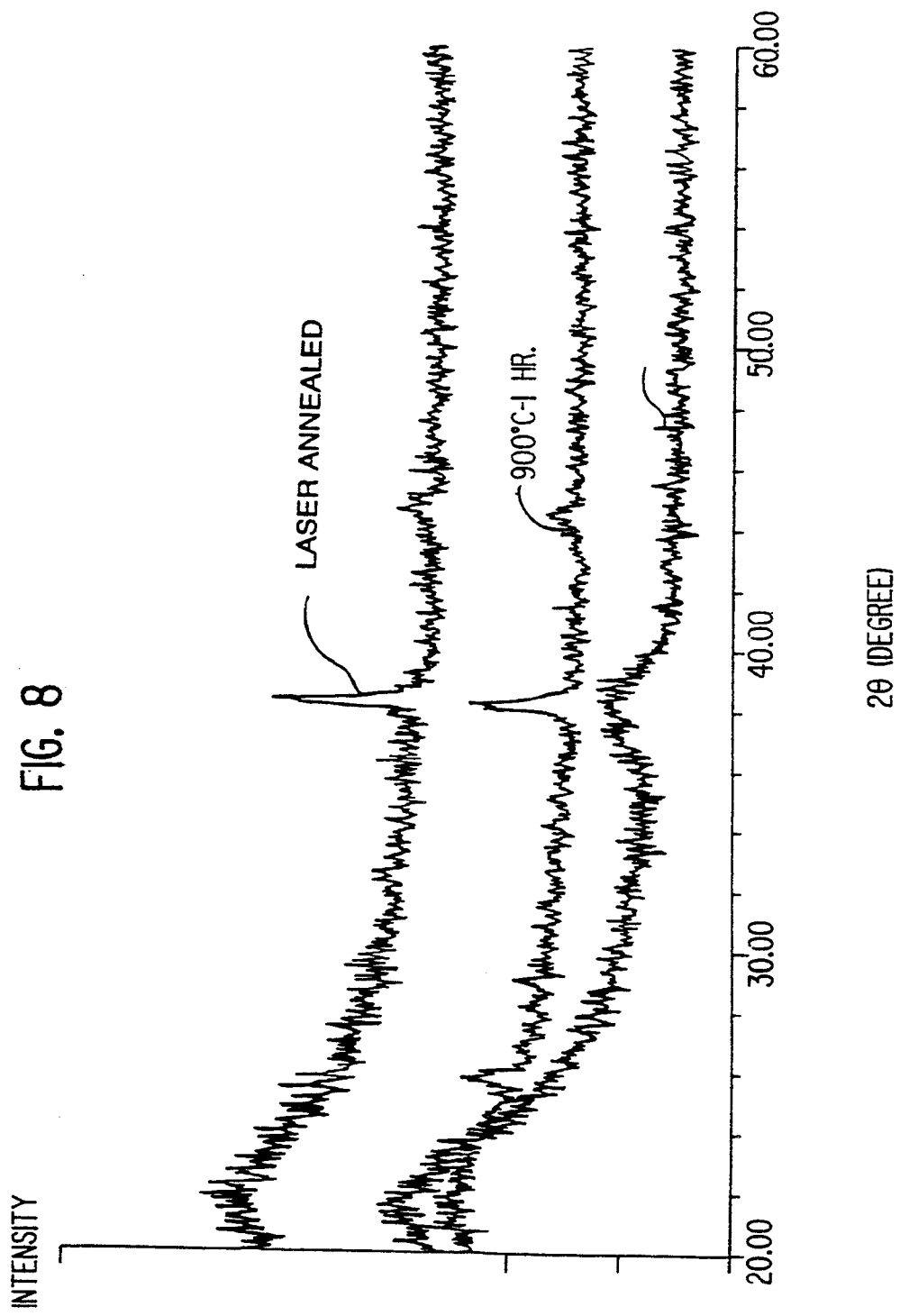
FIG. 8 is a graph showing the X-ray diffraction spectra of inventive and comparative nonlinear optical thin films obtained in Example 4.

FIG. 8 shows the X-ray diffraction spectra of thin films A, A1 and A2. It is seen that in the as-deposited thin film A, only a broad peak corresponding to Au(111) plane was observed and the matrix was amorphous. A peak corresponding to Au(111) plane was observed in the electric oven heat treated thin film A2, and this peak became sharper in the laser annealed thin film A1, indicating better crystallinity. TEM images reveal that in thin film A, the matrix was amorphous and Au fine particles had poor crystallinity. In thin film A2, the matrix had substantially crystallized, but the matrix grain size varied widely. Actually, the matrix crystals had grain sizes in the range of 10 to 1,000 nm, with an average grain size of 200 nm falling within the range of the present invention, but the number of those grains having a size within ±30% of the average grain size was about 50% of the entire grains. The Au fine particles had poor crystallinity. In contrast, thin film A1 contained a microcrystalline matrix and Au fine particles of better crystallinity. The matrix crystals had grain sizes in the range of 50 to 100 nm, with an average grain size of 70 nm. And the number of those grains having a size within 70 nm ±30% was about 90% of the entire grains. The Au fine particles had a mean particle size of 10 nm. There was found a configuration wherein Au fine particles were located at the triple point of the matrix grains.

Next, thin films A, A1 and A2 were determined for $\chi^{(3)}$ value as in Example 3. The laser annealed thin film A1 had a high $\chi^{(3)}$ value in excess of $10^{-7}$ esu. The electric oven heat treated thin film A2 had a lower $\chi^{(3)}$ value than thin film A1. Thin film A had a further lower $\chi^{(3)}$ value than thin film A2. This propensity of $\chi^{(3)}$ value is coincident with a presumption from the above-mentioned transmission spectrum, XRD and TEM observation.

Thin films A, A1 and A2 were measured for dielectric constant $\epsilon$ in accordance with the aforementioned method. Thin film A1 had a high $\epsilon$ value in excess of 150, thin film A2 has a lower value, and thin film A had a further lower value than A2.

COMPARATIVE EXAMPLE 3

A thin film having Au fine particles dispersed in a SiO$_2$ glass matrix was prepared by the same procedure as the preparation of thin film A of Example 4 except that the BaTiO$_3$ was replaced by a SiO$_2$ target and an RF power of 200 W was used. This is designated thin film B. Thin film B was heat treated by the same laser annealing for thin film A1. This is designated thin film B1.

Figure 9:
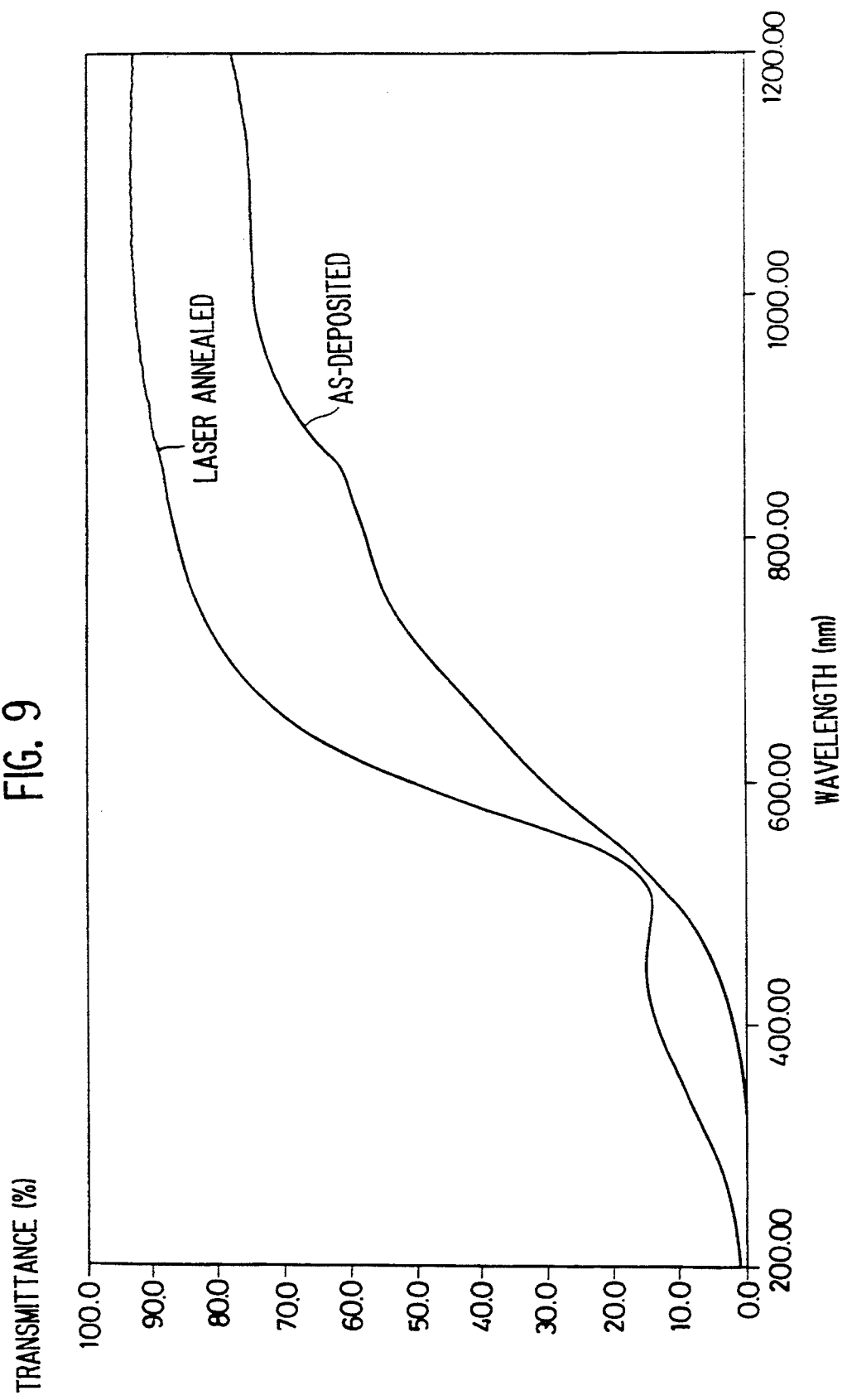
FIG. 9 is a graph showing the transmission spectrum of a conventional nonlinear optical thin film obtained in Comparative Example 3.

Thin films B and B1 were measured for transmission spectrum. The results are shown in FIG. 9. In spite of laser annealing, neither a shifting of the absorption peak position nor a sharpening of the peak was clearly observed.

Figure 10:
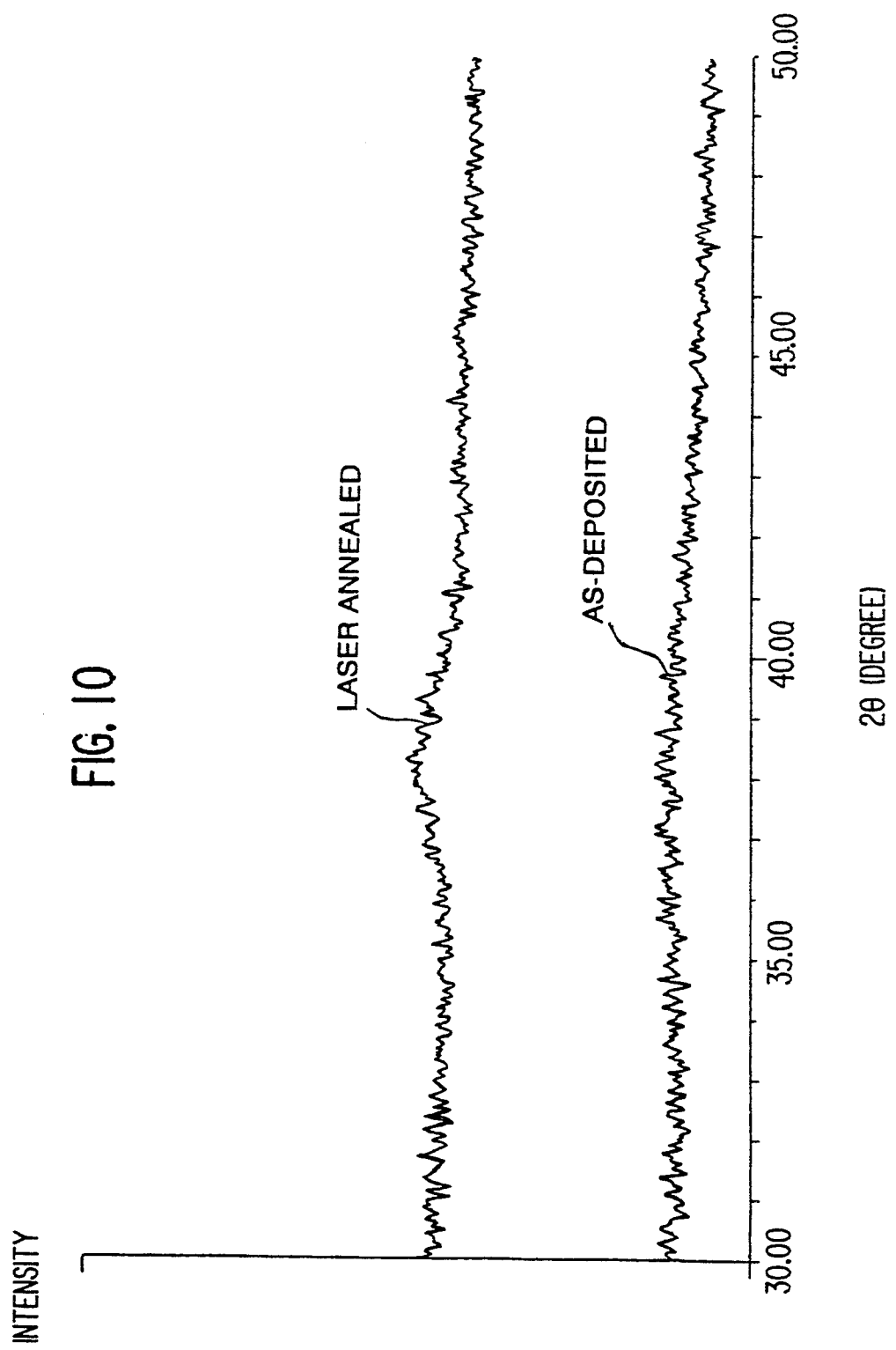
FIG. 10 is a graph showing the X-ray diffraction spectrum of a conventional nonlinear optical thin film obtained in Comparative Example 3.

Thin films B and B1 were measured for X-ray diffraction spectrum. The results are shown in FIG. 10. In thin film B, no definite peak corresponding to Au (111) plane was observed. Thin film B1 showed a peak corresponding to Au (111) plane which was somewhat sharper than thin film B, but its change was extremely small as compared with the change between thin films A and A1 in Example 4. It was also found that the matrix was amorphous in both thin films B and B1.

Thin films B and B1 were observed under TEM to find that their matrix was amorphous and the change of crystallinity of Au fine particles by laser annealing was substantially nil as compared with the change of crystallinity observed in thin films A and A1 of Example 4. The $\chi^{(3)}$ value measured in the same manner as thin film B1 of Example 3 was apparently lower than that of thin film A1.

It is thus confirmed that the property improvement by laser annealing results from refinement of the matrix to more microcrystalline form.

EXAMPLE 5

A thin film was prepared as in Example 1 except that the BaTiO$_3$ target was replaced by a SrTiO$_3$ target. The film thickness was 1,000 Å as reported in Table 7. Similarly, non-heat-treated thin film C and laser annealed thin film C1 were prepared.

Figure 11:
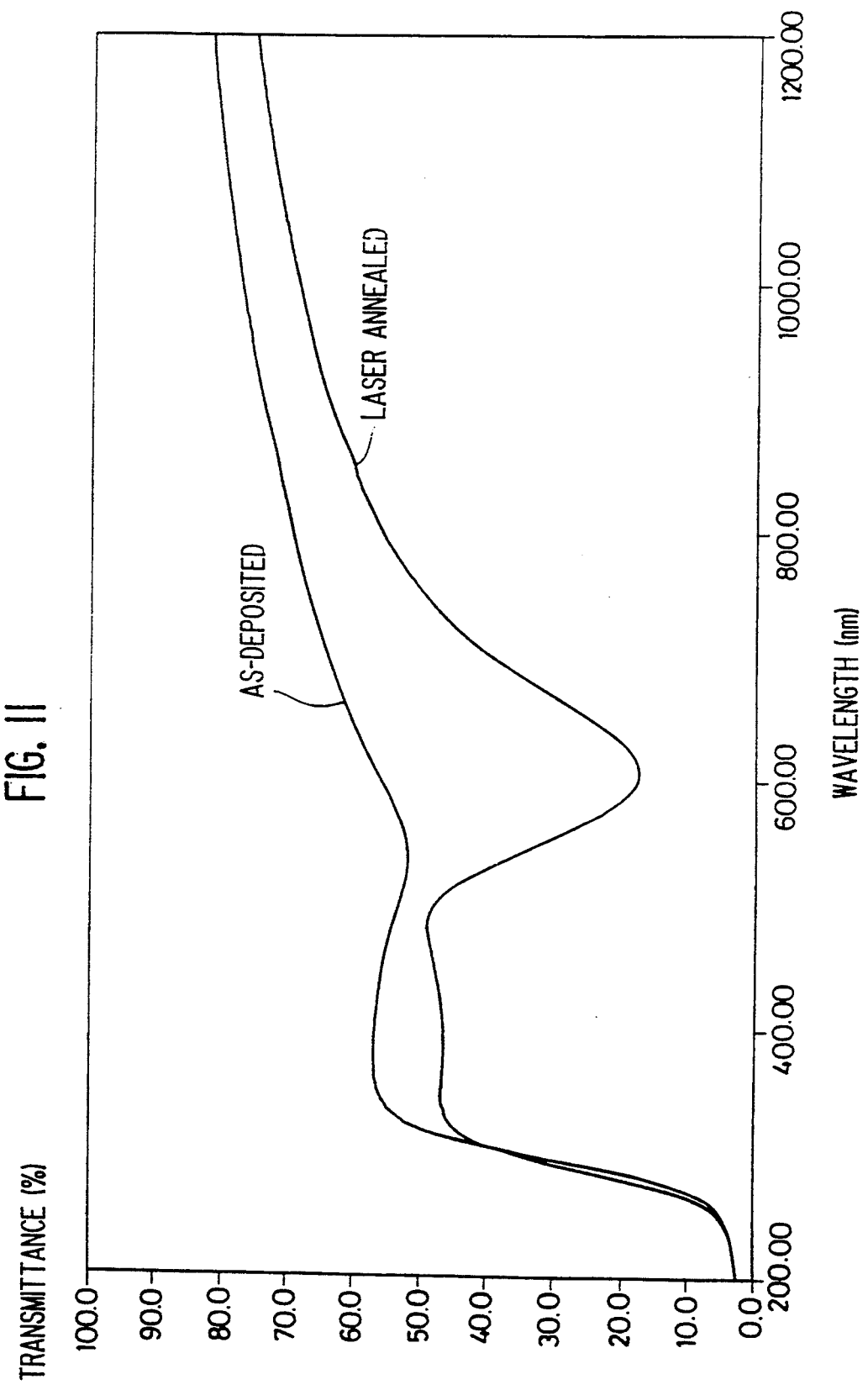
FIG. 11 is a graph showing the transmission spectra of inventive and comparative nonlinear optical thin films obtained in Example 5.

Thin films C and C1 were measured for transmission spectrum. The results are shown in FIG. 11. The plasma resonance absorption peak position determined therefrom is reported in Table 7. Table 7 also reports the heat treating conditions, the amount of Au dispersed (vol %), and film thickness.

TABLE 7

| Thin film | SrTiO$_3$-Au system | | | Plasma absorption peak position | |
|---|---|---|---|---|---|
| | Au dispersed (vol %) | Film thickness (Å) | Heat treatment | (eV) | (nm) |
| C | 7.40 | 1000 | — | 2.130 | 582 |
| C1 | 7.40 | 1000 | laser anneal | 2.032 | 610 |

It is evident from FIG. 11 and Table 7 that the laser annealing caused the absorption peak wavelength to shift to a longer wavelength and the absorption peak to be sharper.

Figure 12:
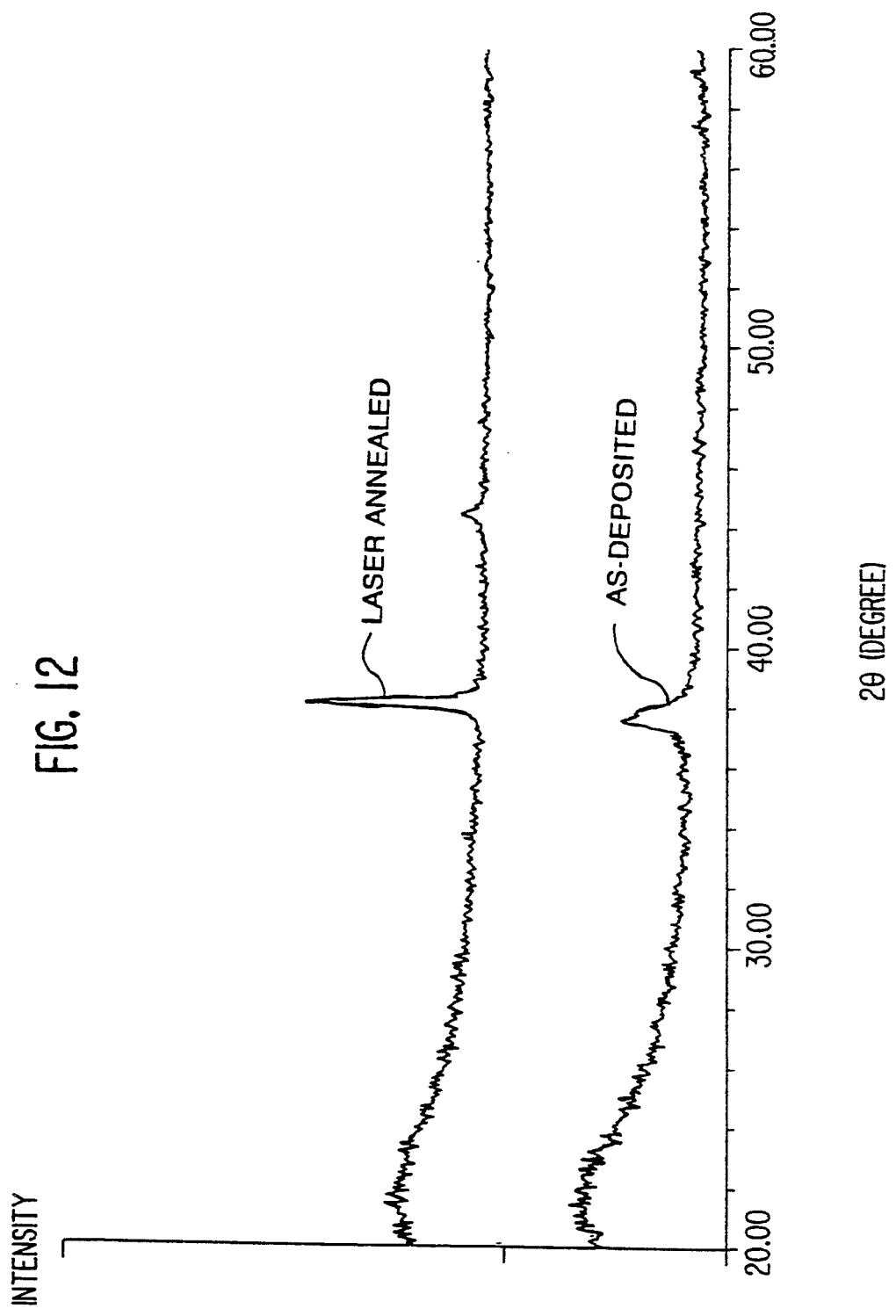
FIG. 12 is a graph showing the X-ray diffraction spectra of inventive and comparative nonlinear optical thin films obtained in Example 5.

FIG. 12 shows the X-ray diffraction spectra of thin films C and C1. It is seen that in the as-deposited thin film C, no sharp peak corresponding to Au(111) plane was observed and the matrix was amorphous. A sharp peak corresponding to Au(111) plane was observed in the laser annealed thin film C1, indicating the improved crystallinity of Au fine particles. Also a TEM image proves the improved crystallinity of Au fine particles. The TEM image further indicates that the matrix is microcrystalline. The matrix crystals had grain sizes in the range of 50 to 90 nm, with an average grain size of 70 nm, which corresponds to a less variation in grain size at the same level as thin film A1 of Example 4. There was found a configuration wherein Au fine particles were located at the triple point of the matrix grains.

Thin films C and C1 were determined for $\chi^{(3)}$ value as in Example 3. Thin film C1 had a high $\chi^{(3)}$ value in excess of $10^{-7}$ esu. Thin film C apparently had a lower $\chi^{(3)}$ value. Thin films C and C1 were measured for dielectric constant $\epsilon$ in accordance with the aforementioned method. Thin film C1 had a high $\epsilon$ value in excess of 80, and thin film C apparently had a lower value.

EXAMPLE 6

Thin films were prepared by the same procedure as Examples 4 and 5 except that Ag was used instead of Au. The changes of transmission spectrum, XRD, TEM observation, $\chi^{(3)}$ value, and dielectric constant $\epsilon$ with heat treating conditions showed the same propensity.

EXAMPLE 7

Devices 101 and 102 were prepared by the same procedure as Example 1 except that an $\alpha$-$Al_2O_3$ (C plane) substrate was used instead of the synthetic quartz glass. Devices 103 to 108 were prepared by heat treating the as-deposited elements at predetermined temperatures for one hour.

EXAMPLE 8

Device 111 was prepared as in Example 7 except that the substrate temperature was 700° C. and the heat treatment after film deposition in Example 7 was omitted.

COMPARATIVE EXAMPLE 4

Devices 121 to 124 were prepared as in Example 7 except that the substrate was changed to synthetic quartz.

COMPARATIVE EXAMPLE 5

Device 131 was prepared as in Example 7 except that the substrate was changed to synthetic quartz, the target was changed to $SiO_2$, and the RF power was changed to 200 W.

EXAMPLE 9

Devices 141 to 143 were prepared as in Example 7 except that the target was changed to $SrTiO_3$.

These Devices were measured for transmission absorption spectrum, from which the plasma resonance absorption peak position was determined. The measurements are reported in Table 8 together with the film-receiving substrate, substrate temperature during film deposition, matrix, Au dispersion amount, film thickness and heat treating temperature.

Figure 13:
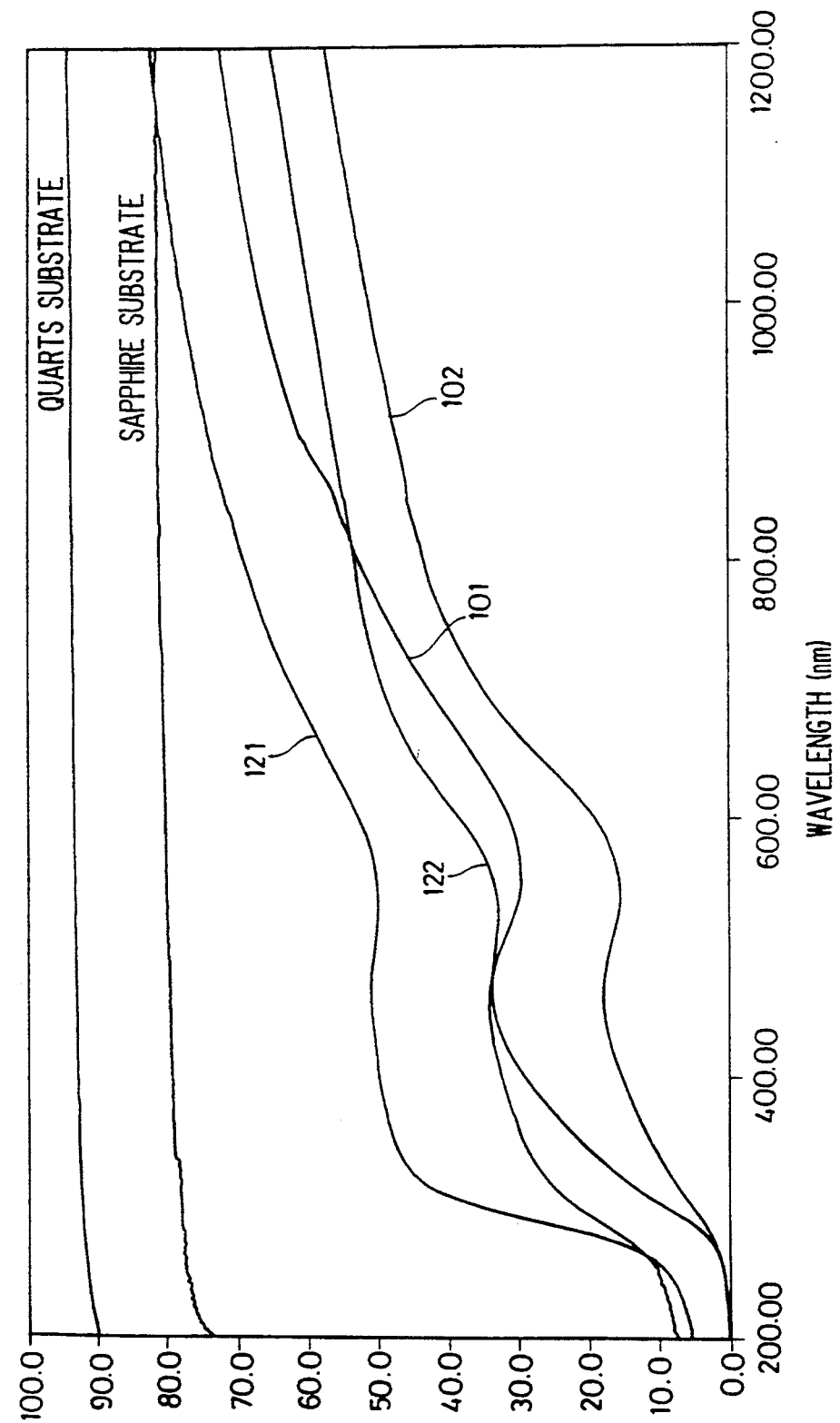
FIG. 13 is a graph showing the influence of the non-heat-treated thin film thickness and film-receiving substrate on the transmission absorption spectrum of inventive and comparative $BaTiO_3$-Au thin film elements obtained in Example 7 and Comparative Example 4 and the transmission absorption spectra of substrates alone.

FIG. 13 shows the measurements of transmission absorption spectrum of Device 101 ($\alpha$-$Al_2O_3$ substrate, 1000 A), Device 102 ($\alpha$-$Al_2O_3$ substrate, 2000 A), Device 121 (synthetic quartz substrate, 1000 A) and Device 122 (synthetic quartz substrate, 2000 Å) which were obtained by using a $BaTiO_3$ target and an $\alpha$-$Al_2O_3$ (C plane) or synthetic quartz substrate and forming a thin film of 1000 A or 2000 A thick thereon at a substrate temperature of 150° C. during film deposition as well as the synthetic quartz substrate and $\alpha$-$Al_2O_3$ (sapphire) substrate on which no Device was formed. Additionally FIG. 14 shows the measurements of transmission absorption spectrum of Device 108 ($\alpha$-$Al_2O_3$ substrate, 1000 A), Devices 106 ($\alpha$-$Al_2O_3$ substrate, 2000 A), Device 123 (synthetic quartz substrate, 1000 A) and Device 124 (synthetic quartz substrate, 2000 A) which were obtained by heat treating the thin films at 900° C. for one hour immediately after film deposition.

Figure 14:
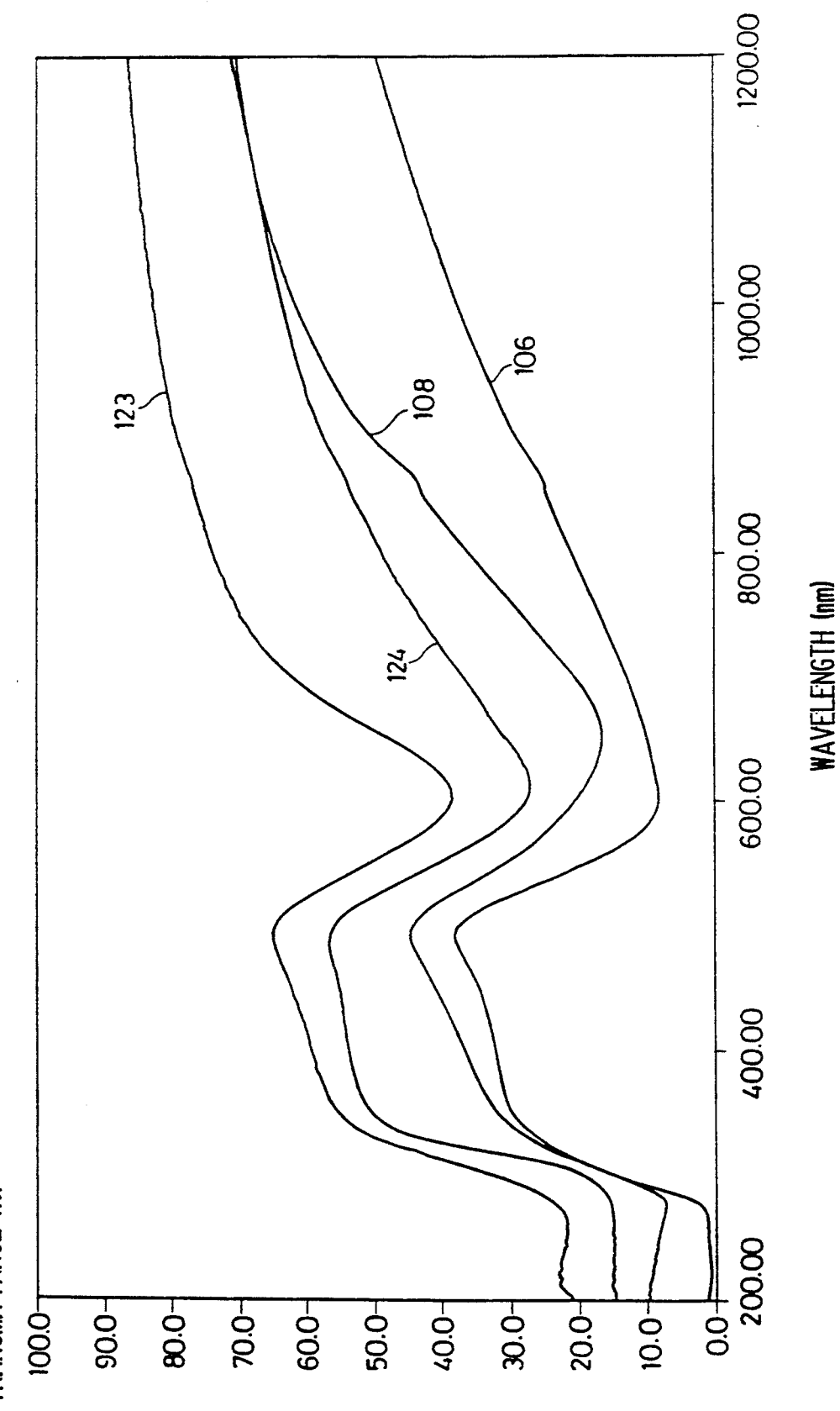
FIG. 14 is a graph showing the influence of the heat-treated thin film thickness and film-receiving substrate on the transmission absorption spectrum of inventive and comparative $BaTiO_3$-Au thin film elements obtained in Example 7 and Comparative Example 4.

The transmittance at the plasma resonance peak position of the transmission absorption spectra shown in FIGS. 13 and 14 suggests that whether or not the Devices are heat treated, those Devices using an $\alpha$-$Al_2O_3$ substrate have a lower transmittance than those Devices using a synthetic quartz substrate and the transmittance becomes lower as the film thickness increases. Regardless of the type of substrate and film thickness, the heat treatment caused the absorption peak to be sharper and the plasma absorption peak wavelength to shift to a longer wavelength side.

Figure 15:
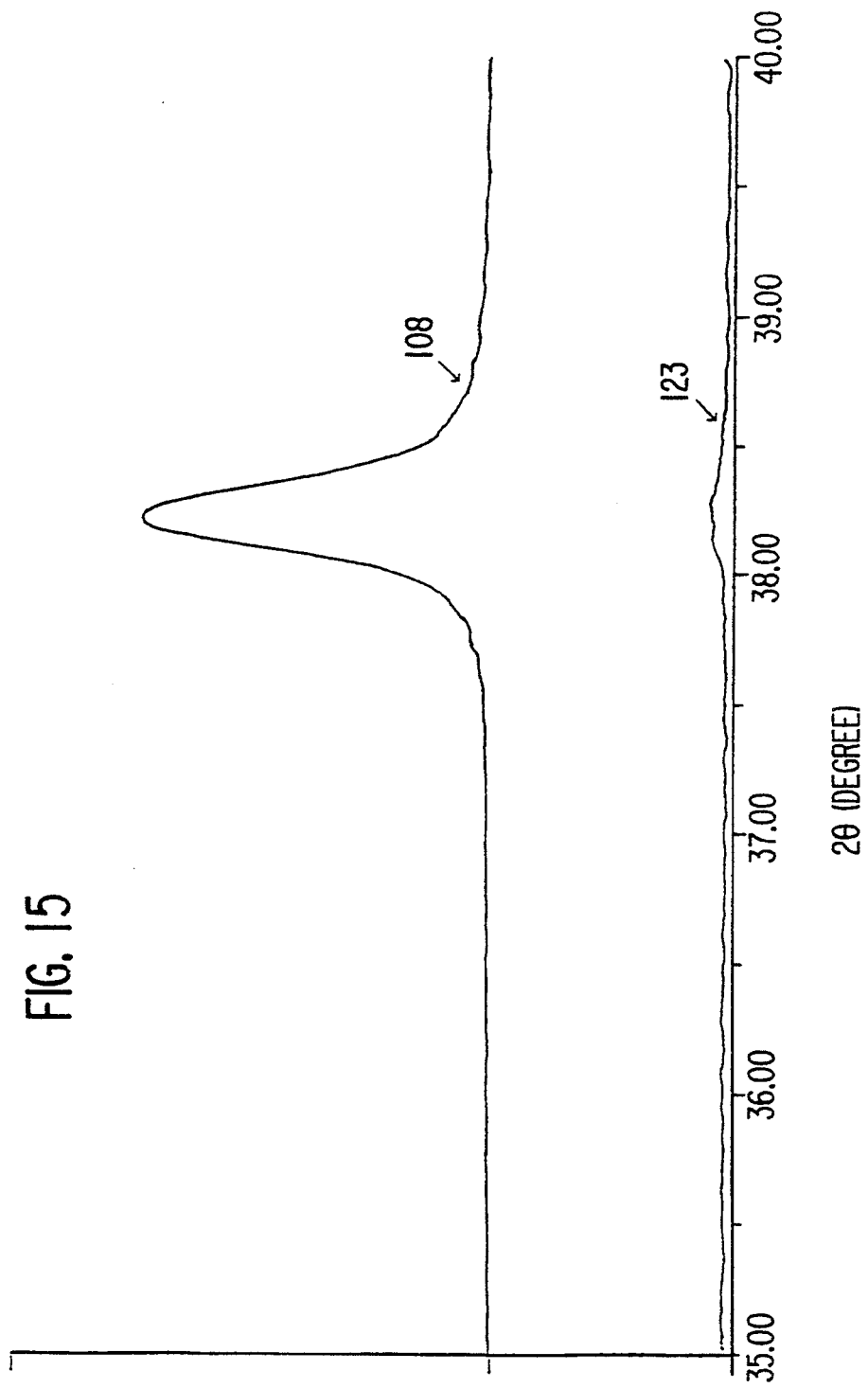
FIG. 15 is a graph showing the influence of the film-receiving substrate on the X-ray diffraction spectrum of inventive and comparative $BaTiO_3$-Au thin film elements obtained in Example 7 and Comparative Example 4.

Next, FIG. 15 shows the X-ray diffraction spectra of Devices 108 and 123 using an $\alpha$-$Al_2O_3$ substrate and a synthetic quartz substrate as the film-receiving substrate and having the same parameters: a film thickness of 1,000 A and a heat treating temperature of 900° C. Device 123 having a film deposited on a synthetic quartz substrate showed a broad peak of Au(111) plane whereas Device 108 having a film deposited on a $\alpha$-$Al_2O_3$ substrate according to the present invention showed a sharp peak of Au(111) plane, indicating improved crystallinity. Also TEM images showed that the matrix of Device 123 had substantially crystallized, but had a large variation in crystal grain size. In contrast, Device 108 had a microcrystalline matrix and showed the improved crystallinity of Au fine particles. There was found a configuration wherein Au fine particles were located at the triple point of the matrix grains.

TABLE 8

| Element No. | Substrate | Substrate temp. (°C.) | Matrix | Au dispersed (vol %) | Film thickness (Å) | Heat treatment temp. (°C.) | Plasma absorption peak position (eV) | Plasma absorption peak position (nm) |
|---|---|---|---|---|---|---|---|---|
| 101 | $Al_2O_3$(C) | 150 | $BaTiO_3$ | 3.74 | 1000 | — | 2.138 | 580 |
| 102 | $Al_2O_3$(C) | 150 | $BaTiO_3$ | 3.74 | 2000 | — | 2.138 | 580 |
| 103 | $Al_2O_3$(C) | 150 | $BaTiO_3$ | 3.74 | 2000 | 500 | 2.101 | 590 |
| 104 | $Al_2O_3$(C) | 150 | $BaTiO_3$ | 3.74 | 2000 | 600 | 2.066 | 600 |
| 105 | $Al_2O_3$(C) | 150 | $BaTiO_3$ | 3.74 | 2000 | 700 | 1.823 | 680 |
| 106 | $Al_2O_3$(C) | 150 | $BaTiO_3$ | 3.74 | 2000 | 900 | 2.066 | 600 |
| 107 | $Al_2O_3$(C) | 150 | $BaTiO_3$ | 3.74 | 2000 | 800 | 1.771 | 700 |
| 108 | $Al_2O_3$(C) | 150 | $BaTiO_3$ | 3.74 | 1000 | 900 | 1.907 | 650 |
| 111 | $Al_2O_3$(C) | 700 | $BaTiO_3$ | 3.74 | 1000 | — | 1.823 | 680 |
| 121* | $SiO_2$ | 150 | $BaTiO_3$ | 3.74 | 1000 | — | 2.339 | 530 |
| 122* | $SiO_2$ | 150 | $BaTiO_3$ | 3.74 | 2000 | — | 2.339 | 530 |
| 123* | $SiO_2$ | 150 | $BaTiO_3$ | 3.74 | 1000 | 900 | 2.039 | 608 |
| 124* | $SiO_2$ | 150 | $BaTiO_3$ | 3.74 | 2000 | 900 | 2.049 | 605 |
| 131* | $SiO_2$ | 150 | $SiO_2$ | 3.74 | 2700 | 900 | 2.389 | 519 |
| 141 | $Al_2O_3$(C) | 150 | $SrTiO_3$ | 3.74 | 1000 | — | 2.101 | 590 |
| 142 | $Al_2O_3$(C) | 150 | $SrTiO_3$ | 3.74 | 1000 | 700 | 2.066 | 600 |
| 143 | $Al_2O_3$(C) | 150 | $SrTiO_3$ | 3.74 | 1000 | 900 | 2.066 | 610 |

*comparison

Figure 16:
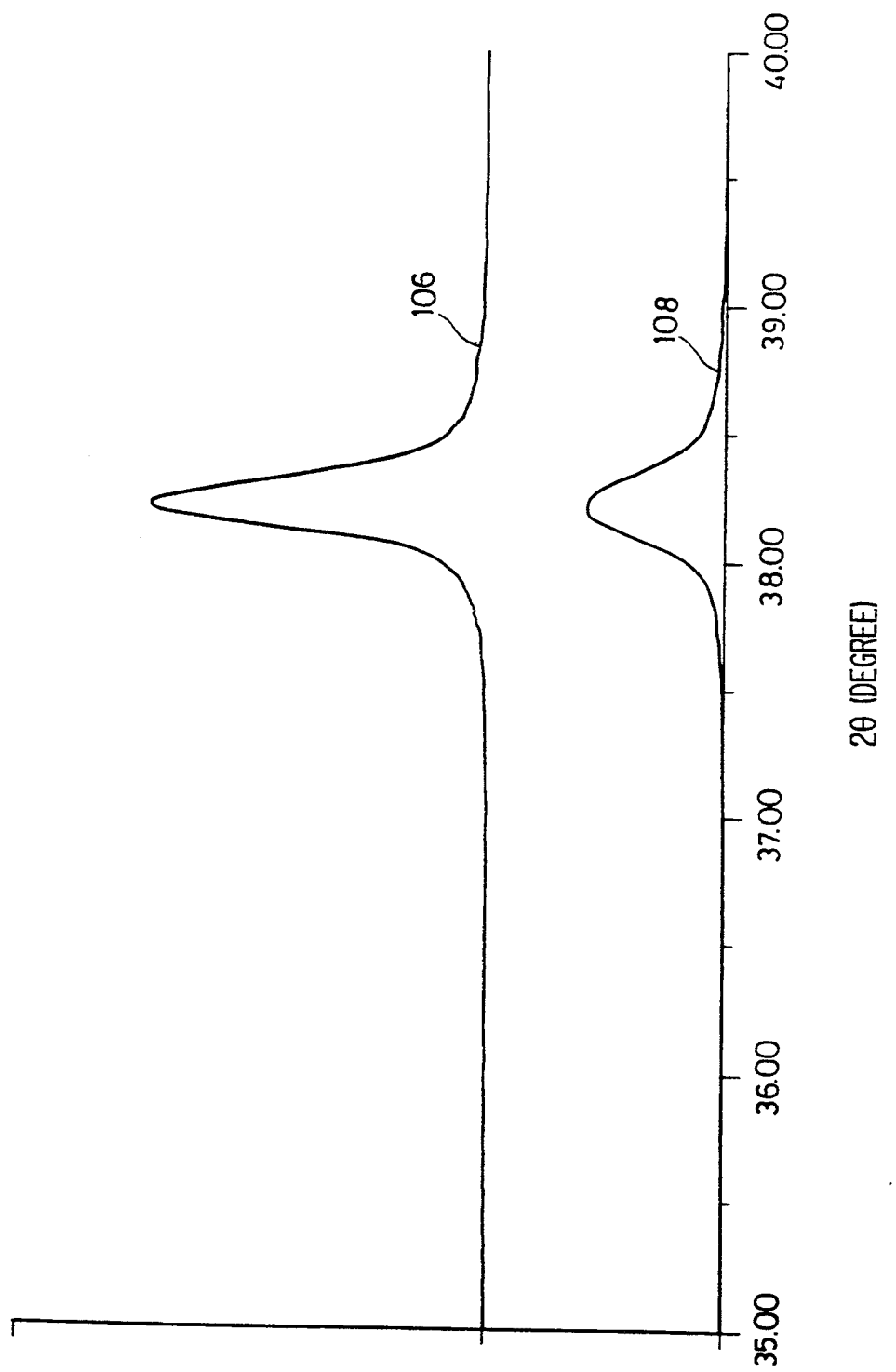
FIG. 16 is a graph showing the influence of the thin film thickness on the X-ray diffraction spectrum of inventive $BaTiO_3$-Au thin film elements obtained in Example 7.

Moreover, FIG. 16 shows the X-ray diffraction spectra of Device 106 (film thickness 2000 A) and 108 (film thickness 1000 A) which were heat treated at 900° C. and different only in film thickness. This confirms the propensity that Au fine particles improve in crystallinity as the film becomes thicker.

Figure 17:
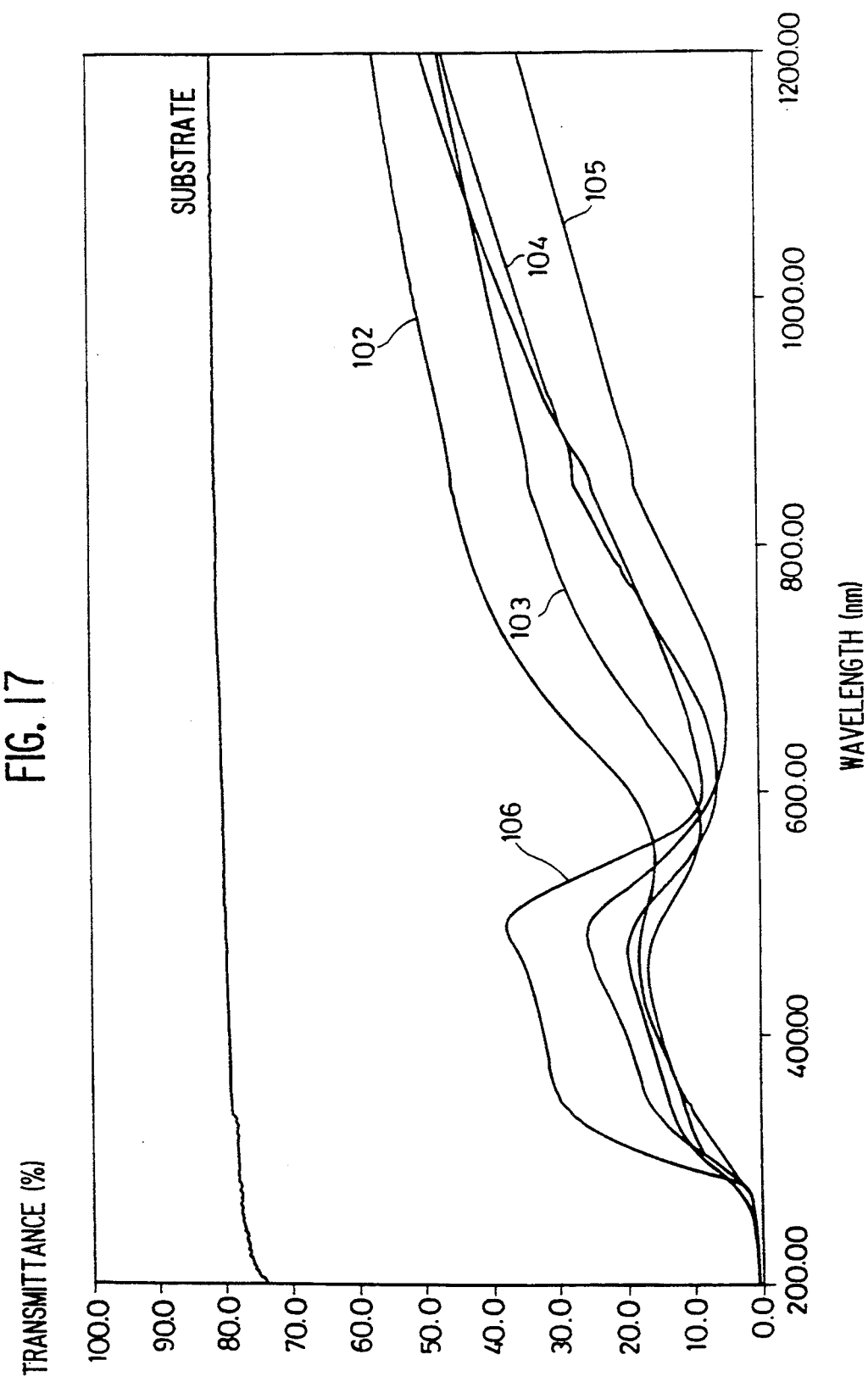
FIG. 17 is a graph showing the effect of heat treatment temperature on the transmission absorption spectrum of inventive $BaTiO_3$-Au thin film elements of 2,000 Å thick formed on $\alpha$-$Al_2O_3$ (C plane) substrate obtained in Example 7.

FIG. 17 shows the measurements of transmission absorption spectrum of Device 102 which was obtained by using a BaTiO$_3$ target and an α-Al$_2$O$_3$ (C plane) substrate and forming a thin film of 2,000 A thick thereon at a substrate temperature of 150° C. during film deposition, and those devices which were obtained by further heat treating at various temperatures, i.e., Device 103 (heat treating temperature 500° C.), Device 104 (heat treating temperature 600° C.), Device 105 (heat treating temperature 700° C.), and Device 106 (heat treating temperature 900° C.) as well as the α-Al$_2$O$_3$ substrate alone. Additionally, FIG. 18 shows the measurements of transmission absorption spectrum of Devices 101, 107 and 108 obtained by forming a thin film of 1,000 A thick.

Figure 18:
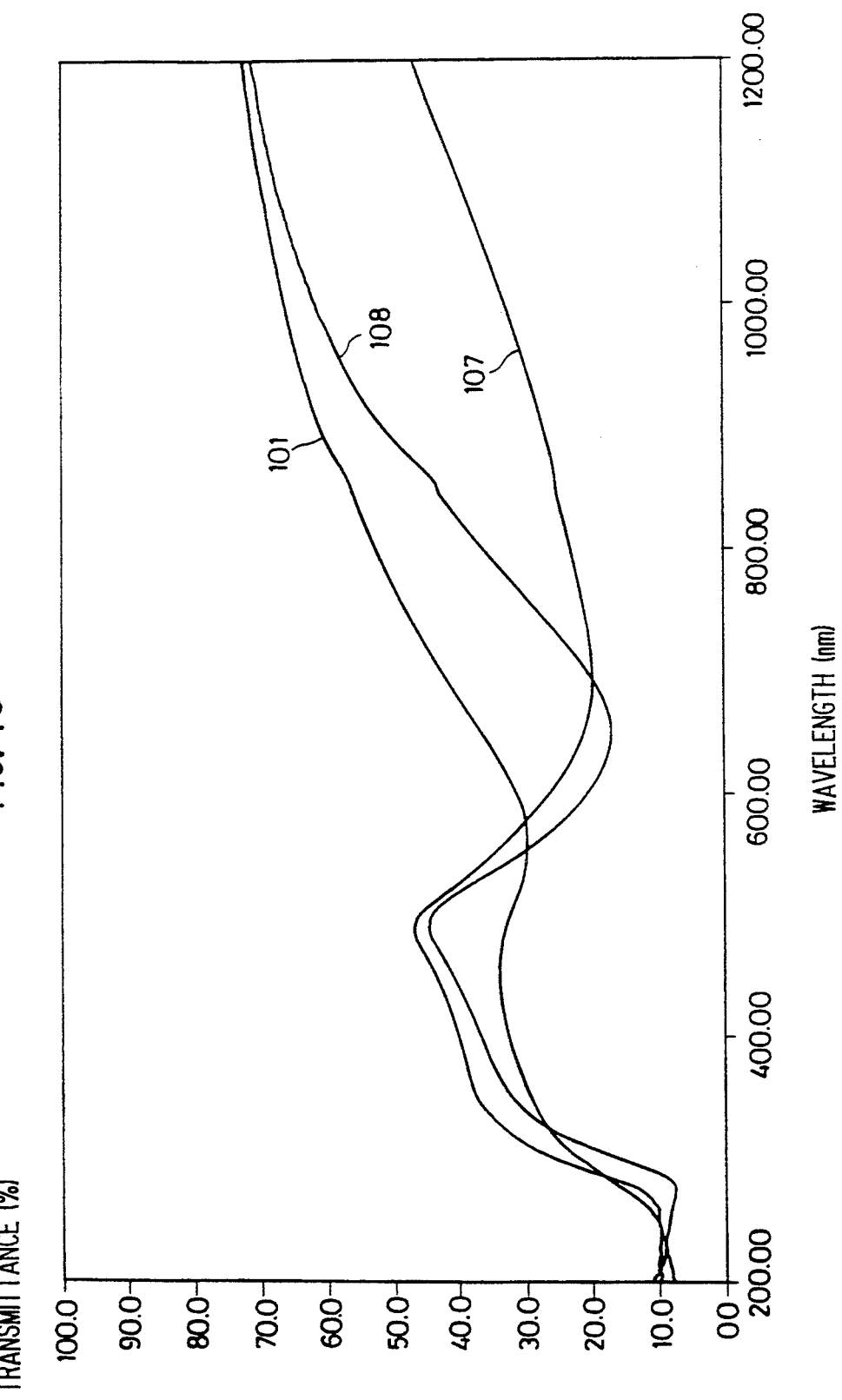
FIG. 18 is a graph showing the effect of heat treatment temperature on the transmission absorption spectrum of inventive $BaTiO_3$-Au thin film elements of 1,000 Å thick formed on $\alpha$-$Al_2O_3$ (C plane) substrate obtained in Example 7.

Like FIGS. 13 and 14, it is seen from FIGS. 17 and 18 that the heat treatment caused the absorption peak to be sharper and the plasma absorption peak wavelength to shift to a longer wavelength side. The reason we suppose is that any interaction takes place in a nonlinear optical thin film containing fine particles of at least one metal in a ferroelectric or highly dielectric matrix because heat treatment after film deposition creates grains in the matrix to enhance the dispersion of metal fine particles in the matrix and improves the crystal particle size distribution of metal fine particles and because metal fine particles are dispersed in the matrix having a high dielectric constant $\epsilon$. In fact, on measurement of the dielectric constant $\epsilon$ of these thin films in accordance with the aforementioned method, the heat treated thin films had a dielectric constant $\epsilon$ as high as 50 to 300 although the untreated thin film had a dielectric constant $\epsilon$ of 10 to 20.

These Devices were determined for $\chi^{(3)}$ value as in Example 3. Among the Device using a BaTiO$_3$ matrix, the Device using α-Al$_2$O$_3$ (C plane) as a film-receiving substrate had a higher $\chi^{(3)}$ value than that using a synthetic quartz substrate, i.e., a high value in excess of $10^{-7}$ esu. The $\chi^{(3)}$ value was increased by heat treatment.

Like the Device using a BaTiO$_3$ matrix, Devices 141 to 143 using a SrTiO$_3$ matrix in Example 9 showed the same propensity with respect to transmission absorption spectrum, X-ray diffraction spectrum, TEM observation, dielectric constant $\epsilon$, and $\chi^{(3)}$ value when α-Al$_2$O$_3$ (C plane) was used as a film-receiving substrate, for example, a high $\chi^{(3)}$ value in excess of $10^{-7}$ esu.

Device 111 which was obtained in Example 8 by setting the substrate temperature at 700° C. during film deposition and omitting the heat treatment immediately after film deposition for inducing crystallization of the metal fine particles and matrix showed the same propensity with respect to transmission absorption spectrum, X-ray diffraction spectrum, TEM observation, dielectric constant $\epsilon$, and $\chi^{(3)}$ value as Device 5 which was heat treated at 700° C. immediately after film deposition for inducing crystallization, for example, an increase of $\chi^{(3)}$ value, specifically a high value in excess of $10^{-7}$ esu.

It is thus evidenced that the advantage of improved properties available on a substrate having a surface with a monoaxially oriented plane is attributable to the microcrystalline refinement of the matrix.

EXAMPLE 10

An Au fine particle dispersed thin film as a middle layer was prepared by the same procedure as Example 1 except that the BaTiO$_3$ target was replaced by a SrTiO$_3$ target. The film thickness was 150 A. The resultant middle layer thin film had an Au concentration of 14% by volume.

The resultant middle layer thin film was heat treated at 900° C. for one hour using an electric oven. The heat treating procedure included heating at a rate of 900° C./hour, holding at 900° C. for one hour, and free cooling.

After the heat treatment, an overlying layer was deposited on the middle layer thin film under the same conditions as the middle layer using an RF magnetron sputtering apparatus and a SrTiO$_3$ target. The film thickness was 150 A.

Using a spectrophotometer, the resultant thin film (sample No. 211) was measured for plasma resonance absorption peak position after deposition of the middle layer, after heat treatment of the middle layer, and after deposition of the overlying layer. The measurements are shown in Table 9.

TABLE 9

| | Middle layer Plasma resonance absorption peak | | | | Overlying layer Plasma resonance absorption peak | | | |
|---|---|---|---|---|---|---|---|---|
| Sample No. | Composition | Film thickness (Å) | As-deposited (nm) | Heat treated (nm) | Composition | Film thickenss (Å) | As-deposited (nm) | Heat treated (nm) |
| 211 (Example 10) | SrTiO$_3$ | 150 | 553 | 573 | SrTiO$_3$ | 150 | 590 | |
| 212 (Example 11) | SrTiO$_3$ | 300 | 578 | 604 | SrTiO$_3$ | 150 | 615 | |
| 213 (Example 12) | SrTiO$_3$ | 300 | 578 | — | SrTiO$_3$ | 150 | 600 | |
| 221 (Example 13) | BaTiO$_3$ | 300 | — | 563 | BaTiO$_3$ | 150 | 599 | |
| 222 (Example 14) | BaTiO$_3$ | 300 | — | 563 | BaTiO$_3$ | 150 | 590 | 603 |
| 231 (Example 15) | SrTiO$_3$ | 150 | 550 | 575 | BaTiO$_3$ | 150 | 595 | |
| 241 (Example 16) | BaTiO$_3$ | 300 | — | 560 | SrTiO$_3$ | 150 | 600 | |
| 251 (CE 6) | SrTiO$_3$ | 150 | 553 | 573 | SiO$_2$ | 300 | 573 | |
| 252 (CE 7) | BaTiO$_3$ | 150 | — | 563 | SiO$_2$ | 300 | 563 | |

Figure 19:
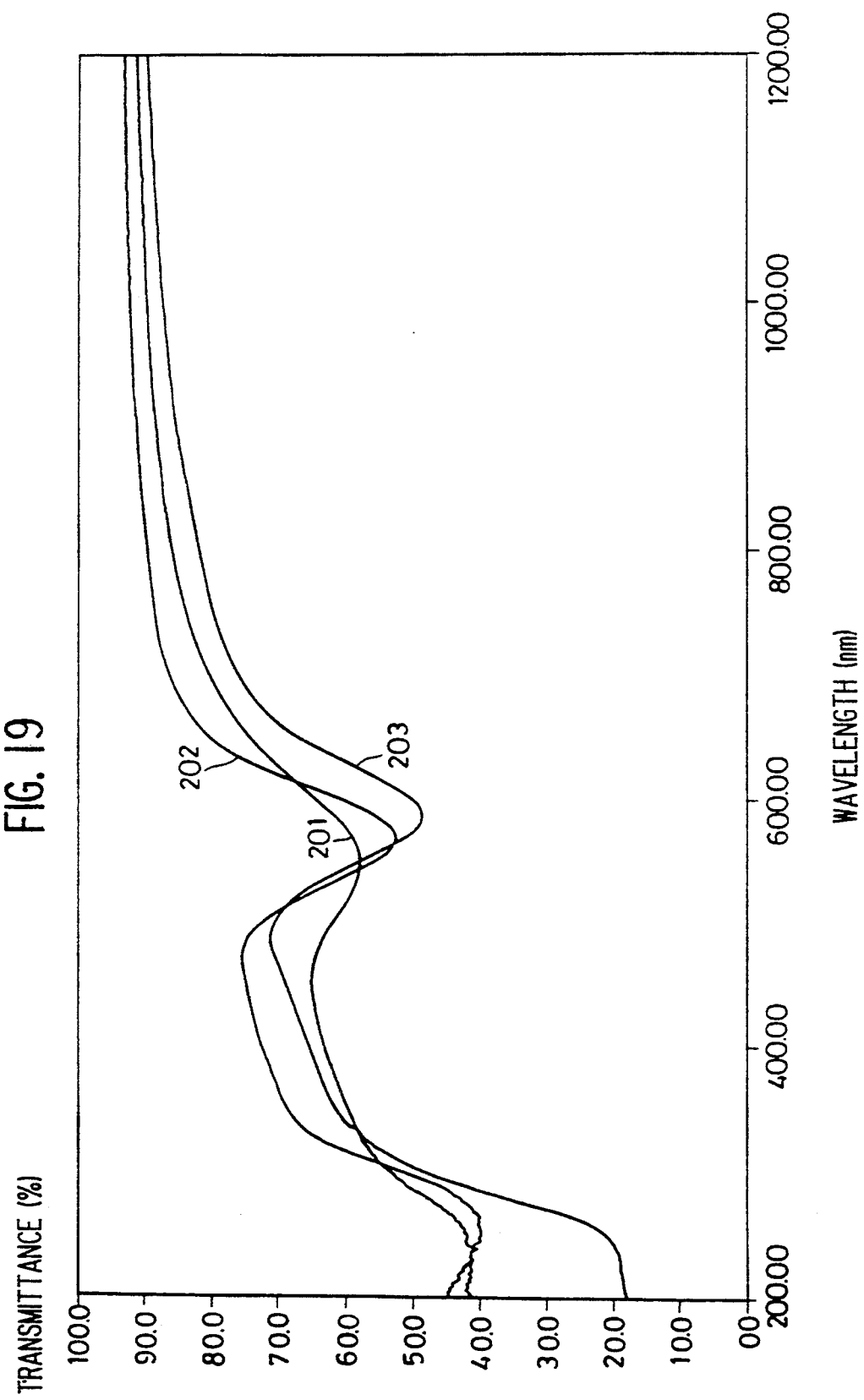
FIG. 19 is a graph showing the influence of heat treatment and overlying layer on the transmission absorption spectrum of inventive $SrTiO_3$-Au thin film (sample No. 211) obtained in Example 10.
Figure 20:
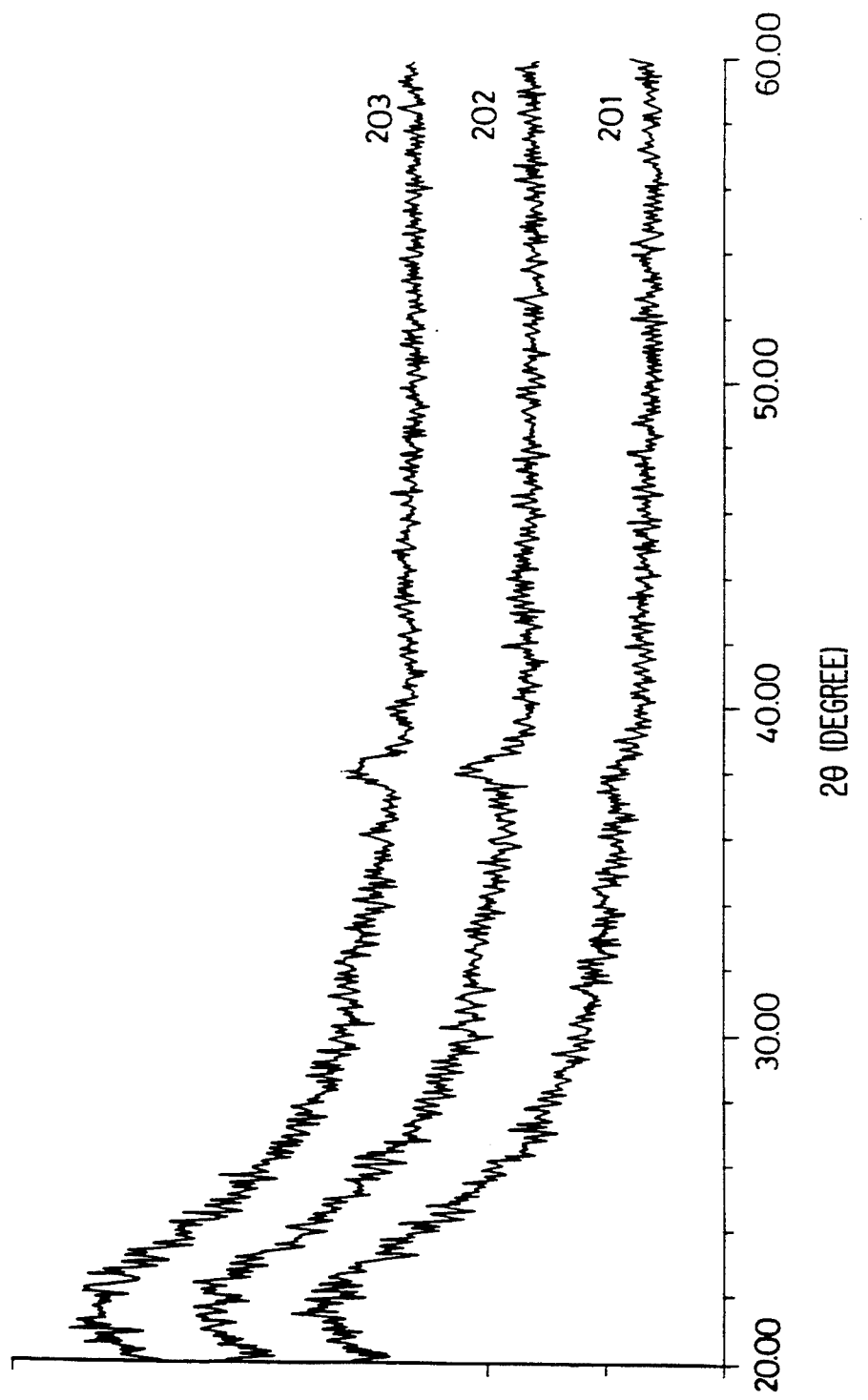
FIG. 20 is a graph showing the influence of heat treatment and overlying layer on the X-ray diffraction spectrum of inventive $SrTiO_3$-Au thin film (sample No. 211) obtained in Example 10.

The absorption peak spectrum of the thin film measured by the spectrophotometer is shown in FIG. 19 and the spectrum measured by X-ray diffractometry is shown in FIG. 20. In FIGS. 19 and 20, 201 is the spectra after deposition of the middle layer, 202 is after heat treatment of the middle layer, and 203 is after deposition of the overlying layer.

EXAMPLE 11

The same procedure as Example 10 was done except that the middle layer had a thickness of 300 A. Using a spectrophotometer, the resultant thin film (sample No. 212) was measured for plasma resonance absorption peak position after deposition of the middle layer, after heat treatment of the middle layer, and after deposition of the overlying layer. The measurements are shown in Table 9.

EXAMPLE 12

The same procedure as Example 11 was done except that the heat treatment of the middle layer was omitted. Using a spectrophotometer, the resultant thin film (sample No. 213) was measured for plasma resonance absorption peak position after deposition of the middle layer and after deposition of the overlying layer. The measurements are shown in Table 9.

EXAMPLE 13

The same procedure as Example 11 was done except that the $SrTiO_3$ target was replaced by a $BaTiO_3$ target. Using a spectrophotometer, the resultant thin film (sample No. 221) was measured for plasma resonance absorption peak position after deposition of the middle layer, after heat treatment of the middle layer, and after deposition of the overlying layer. The measurements are shown in Table 9. Note that no definite plasma resonance absorption peak appeared in this sample after deposition of the middle layer (prior to heat treatment).

Figure 21:
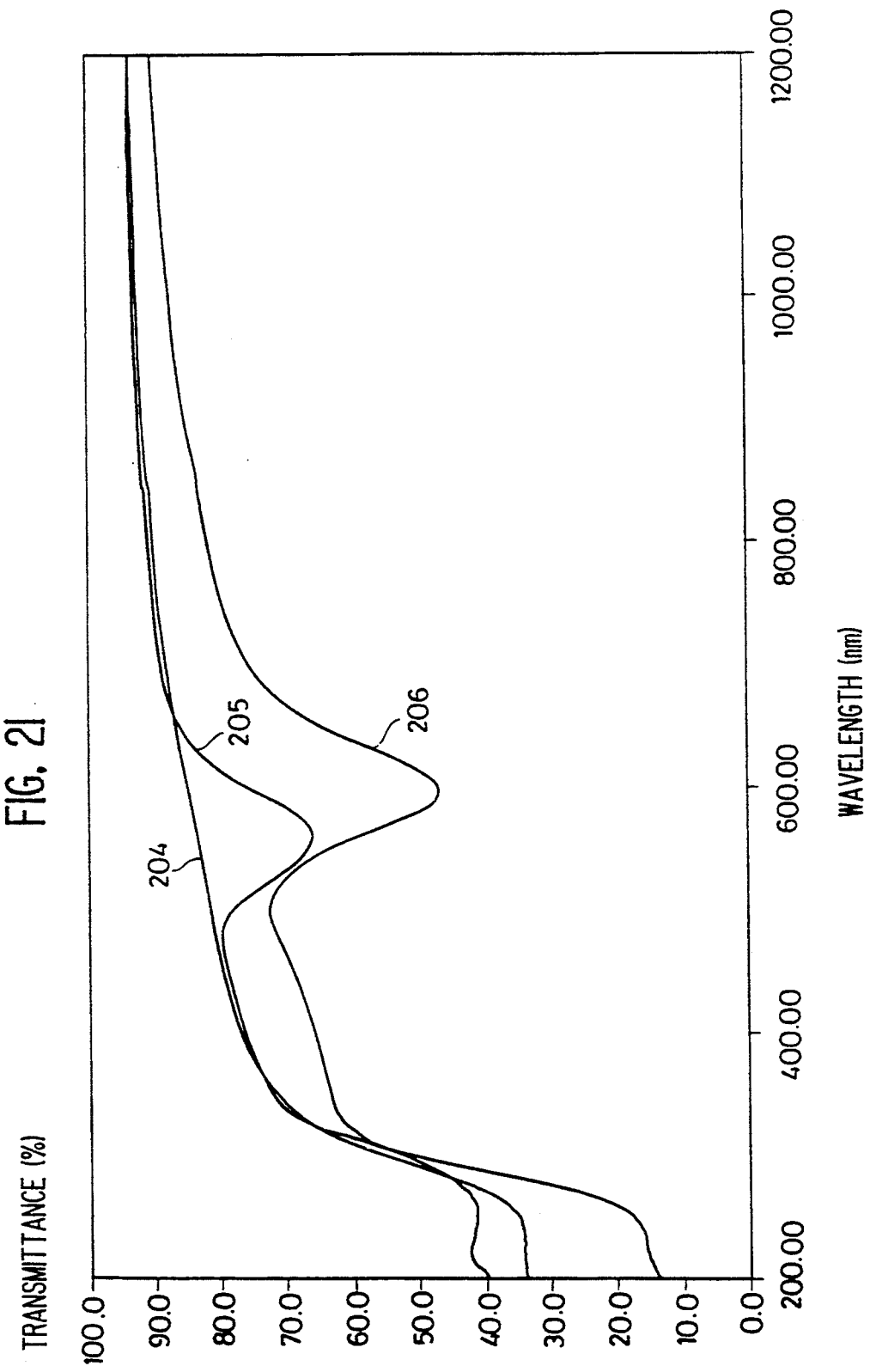
FIG. 21 is a graph showing the influence of heat treatment and overlying layer on the transmission absorption spectrum of inventive $BaTiO_3$-Au thin film (sample No. 221) obtained in Example 13.
Figure 22:
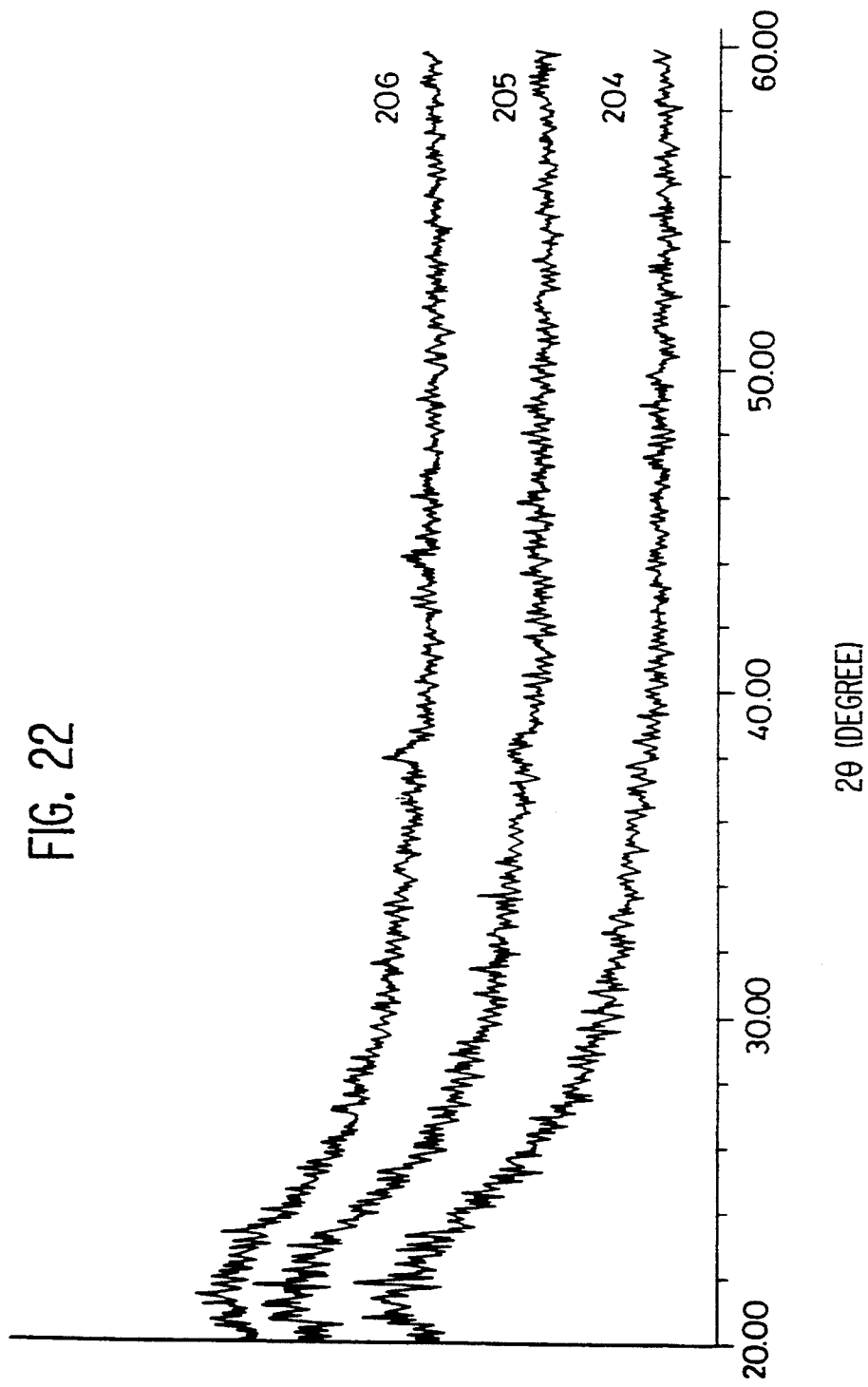
FIG. 22 is a graph showing the influence of heat treatment and overlying layer on the X-ray diffraction spectrum of inventive $BaTiO_3$-Au thin film (sample No. 221) obtained in Example 13.

The absorption peak spectrum of the thin film measured by the spectrophotometer is shown in FIG. 21 and the spectrum measured by X-ray diffractometry is shown in FIG. 22. In FIGS. 21 and 22, 204 is the spectra after deposition of the middle layer, 205 is after heat treatment of the middle layer, and 206 is after deposition of the overlying layer.

EXAMPLE 14

The same procedure as Example 13 was done and heat treatment was done under the conditions described for Example 10. Using a spectrophotometer, the resultant thin film (sample No. 222) was measured for plasma resonance absorption peak position after deposition of the middle layer, after heat treatment of the middle layer, after deposition of the overlying layer, and after heat treatment of the overlying layer. The measurements are shown in Table 9.

EXAMPLE 15

The same procedure as Example 10 was done except that a $SrTiO_3$ target was used for deposition of the middle layer and a $BaTiO_3$ target was used for deposition of the overlying layer. Using a spectrophotometer, the resultant thin film (sample No. 231) was measured for plasma resonance absorption peak position after deposition of the middle layer, after heat treatment of the middle layer, and after deposition of the overlying layer. The measurements are shown in Table 9.

EXAMPLE 16

The same procedure as Example 10 was done except that a $BaTiO_3$ target was used for deposition of the middle layer and a $SrTiO_3$ target was used for deposition of the overlying layer. Using a spectrophotometer, the resultant thin film (sample No. 241) was measured for plasma resonance absorption peak position after deposition of the middle layer, after heat treatment of the middle layer, and after deposition of the overlying layer. The measurements are shown in Table 9.

COMPARATIVE EXAMPLE 6

A middle layer was deposited and heat treated as in Example 10 before an overlying layer of 300 A thick was deposited using a $SiO_2$ target instead of the $SrTiO_3$ target. Using a spectrophotometer, the resultant thin film (sample No. 251) was measured for plasma resonance absorption peak position after deposition of the middle layer, after heat treatment of the middle layer, and after deposition of the overlying layer. The measurements are shown in Table 9.

COMPARATIVE EXAMPLE 7

The same procedure as Comparative Example 6 was done except that a $BaTiO_3$ target was used for deposition of the middle layer. Using a spectrophotometer, the resultant thin film (sample No. 252) was measured for plasma resonance absorption peak position after deposition of the middle layer, after heat treatment of the middle layer, and after deposition of the overlying layer. The measurements are shown in Table 9.

EXAMPLE 17

An underlying layer of 300 A thick was deposited on a synthetic quartz glass substrate under the conditions described in Example 10 except that a $SrTiO_3$ target was used. On the thus obtained underlying layer, a middle layer was deposited as in Example 10 by co-sputtering of a $SrTiO_3$ target having Au chips rested thereon.

The resultant thin film was heat treated under the conditions described in Example 10. Using a spectrophotometer, the heat treated thin film (sample No. 261) was measured for plasma resonance absorption peak position after deposition of the middle layer and after heat treatment of the middle layer. The measurements are shown in Table 10.

TABLE 10

| | Underlying layer | | | Middle layer | | Plasma resonance absorption peak | |
|---|---|---|---|---|---|---|---|
| Sample No. | Composition | Film thickness (Å) | Heat treatment | Composition | Film thickness (Å) | As-deposited (nm) | Heat treated (nm) |
| 261 (Example 17) | $SrTiO_3$ | 300 | none | $SrTiO_3$ | 150 | 588 | 600 |
| 262 (Example 18) | $SrTiO_3$ | 300 | treated | $SrTiO_3$ | 150 | 595 | 610 |
| 271 (Example 19) | $BaTiO_3$ | 300 | none | $BaTiO_3$ | 150 | — | 595 |
| 272 (Example 20) | $BaTiO_3$ | 300 | treated | $BaTiO_3$ | 150 | 570 | 590 |
| 281 (Example 21) | $SrTiO_3$ | 300 | none | $BaTiO_3$ | 150 | — | 585 |
| 291 (Example 22) | $BaTiO_3$ | 300 | treated | $SrTiO_3$ | 150 | 565 | 590 |

EXAMPLE 18

An underlying layer of 300 A thick was deposited on a synthetic quartz glass substrate under the same conditions as in Example 10 except that a $SrTiO_3$ target was used. The underlying layer was heat treated under the conditions described in Example 10. A middle layer was then deposited on the heat treated underlying layer as in Example 10 by co-sputtering of a SrTiO₃ target having Au chips rested thereon.

The resultant thin film was heat treated under the conditions described in Example 10. Using a spectrophotometer, the heat treated thin film (sample No. 262) was measured for plasma resonance absorption peak position after deposition of the middle layer and after heat treatment of the middle layer. The measurements are shown in Table 10.

EXAMPLE 19

Film deposition was done under the same conditions as in Example 17 except that the SrTiO₃ target was replaced by a BaTiO₃ target during deposition of the underlying layer and middle layer. Using a spectrophotometer, the heat treated thin film (sample No. 271) was measured for plasma resonance absorption peak position after deposition of the middle layer and after heat treatment of the middle layer. The measurements are shown in Table 10.

EXAMPLE 20

Film deposition was done under the same conditions as in Example 18 except that the SrTiO₃ target was replaced by a BaTiO₃ target during deposition of the underlying layer and middle layer. Using a spectrophotometer, the heat treated thin film (sample No. 272) was measured for plasma resonance absorption peak position after deposition of the middle layer and after heat treatment of the middle layer. The measurements are shown in Table 10.

EXAMPLE 21

Film deposition was done under the same conditions as in Example 18 except that a SrTiO₃ target was used during deposition of the underlying layer and the SrTiO₃ target was replaced by a BaTiO₃ target during deposition of the middle layer. Using a spectrophotometer, the heat treated thin film (sample No. 281) was measured for plasma resonance absorption peak position after deposition of the middle layer and after heat treatment of the middle layer. The measurements are shown in Table 10.

EXAMPLE 22

Film deposition was done under the same conditions as in Example 18 except that a BaTiO₃ target was used during deposition of the underlying layer. Using a spectrophotometer, the heat treated thin film (sample No. 291) was measured for plasma resonance absorption peak position after deposition of the middle layer and after heat treatment of the middle layer. The measurements are shown in Table 10.

The thus obtained thin films having a middle layer and an underlying and/or overlying layer were measured for dielectric constant $\epsilon$ by the aforementioned method to find that the non-heat-treated thin film had a value of 10 to 20 and the thin film having at least the middle layer heat treated had a value of 50 to 300.

Among the resultant samples, those thin films having the middle layer heat treated were measured for $\chi^{(3)}$ value by the aforementioned measurement method to find a value of $10^{-7}$ to $10^{-6}$ esu.

As shown in Table 9, the plasma resonance absorption peak position is further shifted by providing an overlying layer of a ferroelectric or highly dielectric material on a middle layer, but no shift occurred with an overlying layer of SiO₂. The influence of the underlying layer shown in Table 10 is that when the plasma resonance absorption peak position of sample Nos. 261 and 262 is compared with the plasma resonance absorption peak position of sample No. 211 before and after heat treatment of the middle layer, it is further shifted by providing an underlying layer (irrespective of whether or not heat treatment is done) while using the middle layer of the same thickness. This propensity is the same between sample Nos. 271 and 272 and between sample Nos. 221 and 222 which are different in composition. That is, the shift width is changed by providing an underlying layer.

ADVANTAGES

According to the present invention, there is obtained a nonlinear optical thin film wherein metal fine particles are dispersed in a ferroelectric or highly dielectric matrix which has a high $\chi^{(3)}$ value of at least $10^{-7}$ esu and whose absorption peak position is freely variable to any desired wavelength over a substantial width. By heat treating the thin film by a rapid heating-rapid quenching method or using a monoaxially oriented plane of a single crystal substrate surface as a film-receiving substrate, the metal fine particles and matrix are further improved in crystallinity to a uniform particle size. Consequently, the $\chi^{(3)}$ value is further increased.

Also, by forming a portion having a lower content of the metal fine particles than a middle portion at a surface on an upper and/or lower side of the thin film, there is provided a nonlinear optical thin film in which the wavelength shift width of plasma absorption peak position is further expandable and finely adjustable to a desired excitation wavelength.

We claim:

1. A composite structure comprising a nonlinear optical film on a substrate, said film containing 1 to 80% by volume of metal particles having a mean particle size of 1 to 100 nm in a ferroelectric or highly dielectric matrix, said matrix having a dielectric constant of at least about 10 at room temperature.

2. The composite structure of claim 1 wherein said matrix is of titanium oxide or a composite oxide containing titanium oxide.

3. The composite structure of claim 1 wherein the metal of which said metal particles are made is Au, Ag, Cu or an alloy thereof.

4. The composite structure of claim 1 wherein said matrix includes grains having a mean grain size of 40 to 1,000 nm.

5. The composite structure of claim 1 wherein said metal particles are located at triple point positions of grains of said matrix.

6. The composite structure of claim 1, wherein said nonlinear optical film has a dielectric constant of at least 10.

7. The composite structure of claim 1, wherein said nonlinear optical film has a third-order nonlinear susceptibility $\chi^{(3)}$ of at least $10^{-7}$ esu.

8. The composite structure of claim 1 wherein said nonlinear optical film is formed and then heat treated at a temperature of at least 100° C. for adjusting the resonance absorption wavelength position of said metal particles to a desired wavelength.

9. The composite structure of claim 8 wherein the forming of the film is by a co-sputtering technique.

10. The composite structure of claim 8 wherein the heat treatment is carried out at a temperature of 100° to 1,100° C.

11. The composite structure of claim 1 which is obtained by forming said nonlinear optical film, heating at a temperature of at least 100° C. and then quenching the film at a cooling rate of at least $10^3$° C./sec.

12. The composite structure of claim 11 wherein the heat treatment is by irradiating active energy rays.

13. The composite structure of claim 11 wherein the forming of said film is by a co-sputtering technique.

14. The composite structure of claim 1, wherein said nonlinear optical film is formed on a monoaxially oriented plane of a single crystal substrate surface.

15. The composite structure of claim 14 wherein said nonlinear optical film is formed on the monoaxially oriented plane of a single crystal substrate surface and then heat treated at a temperature of at least 100° C. for adjusting the crystallinity and particle size of said particles.

16. The composite structure of claim 15 wherein the heat treatment is carried out at a temperature of 100° to 1,100° C.

17. The composite structure of claim 15 wherein the heat treatment includes the steps of heating the film by irradiating active energy rays and quenching the film at a cooling rate of at least $10^3$° C./sec.

18. The composite structure of claim 15 wherein the forming of the film is by a co-sputtering technique.

19. The composite structure of claim 15 wherein the film is formed while maintaining the substrate at a temperature of at least 600° C.

20. The composite structure of claim 14, wherein said nonliner optical film is formed on the monoaxially oriented plane of a single crystal substrate surface while maintaining the substrate at a temperature of at least 600° C.

21. The composite structure of claim 20 wherein the forming of the film is by a co-sputtering technique.

22. The composite structure of claim 1 wherein said metal particles are dispersed in said film of ferroelectric or highly dielectric matrix such that the metal particles are contained at a lower content in a surface portion on an upper and/or lower side of said film than in a middle portion of said film.

23. The composite structure of claim 1 wherein a surface layer of a ferroelectric or highly dielectric material is formed adjacent to an upper and/or lower side of said nonlinear optical film.

24. The composite structure of claim 23 wherein said surface layer contains metal particles in a lower content than said nonlinear optical film.

25. The composite structure of claim 23 wherein said surface layer is free of metal particles.

26. The composite structure of claim 23 wherein said nonlinear optical film and surface layer are formed by a sputtering technique.

27. The composite structure of claim 23 which is further subject to heat treatment at a temperature of at least 100° C.

* * * * *